(12) United States Patent
Mu

(10) Patent No.: US 11,845,220 B2
(45) Date of Patent: Dec. 19, 2023

(54) ADJUSTABLE SLIT-TYPE EXTRUSION HEAD, AND ADDITIVE MANUFACTURING SYSTEM DEVICE HAVING SAME

(71) Applicant: Zhenru Mu, Beijing (CN)

(72) Inventor: Zhenru Mu, Beijing (CN)

(73) Assignee: Zhenru Mu, Beijing (CN)

( * ) Notice: Subject to any disclaimer, the term of this patent is extended or adjusted under 35 U.S.C. 154(b) by 313 days.

(21) Appl. No.: 17/424,177

(22) PCT Filed: Jan. 13, 2020

(86) PCT No.: PCT/CN2020/071865
§ 371 (c)(1),
(2) Date: Jul. 20, 2021

(87) PCT Pub. No.: WO2020/156134
PCT Pub. Date: Aug. 6, 2020

(65) Prior Publication Data
US 2022/0072779 A1 Mar. 10, 2022

(30) Foreign Application Priority Data

Jan. 29, 2019 (CN) .......................... 201910071799.6
Jan. 29, 2019 (CN) .......................... 201920148380.1

(51) Int. Cl.
*B29C 64/118* (2017.01)
*B33Y 30/00* (2015.01)
(Continued)

(52) U.S. Cl.
CPC .......... *B29C 64/209* (2017.08); *B29C 64/236* (2017.08); *B29C 64/295* (2017.08);
(Continued)

(58) Field of Classification Search
CPC ..... B29C 64/106; B29C 64/118; B29C 64/20; B29C 64/209; B29C 64/30; B29C 64/321; B33Y 10/00; B33Y 30/00; B33Y 40/00
See application file for complete search history.

(56) References Cited

U.S. PATENT DOCUMENTS

| 556,472 | A | * | 3/1896 | McCarroll | ............ B29C 64/295 |
| | | | | | 118/301 |
| 4,021,170 | A | * | 5/1977 | Andersen | .............. B29C 48/875 |
| | | | | | 264/312 |
| 2019/0099939 | A1 | * | 4/2019 | Ahn | ...................... B29C 64/393 |

FOREIGN PATENT DOCUMENTS

| CN | 205167581 U | 4/2016 |
| CN | 206899751 U | 1/2018 |

(Continued)

OTHER PUBLICATIONS

International Search Report for corresponding application PCT/CN2020/071865 filed Jan. 13, 2020; dated Apr. 1, 2020.

*Primary Examiner* — Thu-Khanh T. Nguyen
(74) *Attorney, Agent, or Firm* — Gang Yu

(57) ABSTRACT

The present disclosure provides a slit-adjustable-type extrusion head. The slit-adjustable-type extrusion head includes a body being provided with an adjusting slide groove extending in an axial direction and a balancing slide part; a core being provided with an adjusting slider and a balancing adaptation part which match the adjusting slide groove and the balancing slide part in shape and are in sliding cooperation with the adjusting slide groove and the balancing slide part in a liquid-tight manner respectively; an inlet used for receiving a construction material; a channel jointly defined by the body and the core so as to accommodate the construction material; and a slit-type outlet that is jointly defined by the adjusting slide groove and the adjusting slider and used for extruding the construction material.

16 Claims, 23 Drawing Sheets

(51) Int. Cl.
  *B29C 64/209* (2017.01)
  *B29C 64/295* (2017.01)
  *B29C 64/343* (2017.01)
  *B29C 64/236* (2017.01)
  *B33Y 40/00* (2020.01)
(52) U.S. Cl.
  CPC ............ *B29C 64/343* (2017.08); *B33Y 30/00* (2014.12); *B33Y 40/00* (2014.12)

(56) References Cited

FOREIGN PATENT DOCUMENTS

| | | |
|---|---|---|
| CN | 108016040 A | 5/2018 |
| CN | 109571954 A | 4/2019 |
| DE | 102016224047 A1 | 6/2018 |

\* cited by examiner

# ADJUSTABLE SLIT-TYPE EXTRUSION HEAD, AND ADDITIVE MANUFACTURING SYSTEM DEVICE HAVING SAME

CROSS-REFERENCE TO RELATED APPLICATION

The present disclosure is a national stage application of International Patent Application No. PCT/CN 2020/071865, which is filed on Jan. 13, 2020, and claims the priority of Chinese Patent Application No. 201910071799.6, to the National intellectual Property Administration, PRC on Jan. 29, 2019, entitled "Slit-Adjustable-Type Extrusion Head", and No. 201920148380.1, to the National intellectual Property Administration, PRC on Jan. 29, 2019, entitled "Slit-Adjustable-Type Extrusion Head and Additive Manufacturing System Device with Slit-Adjustable-Type Extrusion Head", the entire contents of which are incorporated herein by reference.

TECHNICAL FIELD

The present disclosure relates to an extrusion-based additive manufacturing system, and in particular to an extrusion head assembly used in an extrusion-based additive manufacturing system.

BACKGROUND

The extrusion-based additive manufacturing system (for example, "Apparatus and method for creating three-dimensional objects" disclosed in U.S. Pat. No. 5,121,329) is used for extruding flowable consumable construction materials to create three-dimensional (3D) parts according to digital representation of the three-dimensional (3D) parts in a layer-by-layer manner.

SUMMARY

Technical Problem

An extrusion head of an existing extrusion-based additive manufacturing system is a point-shaped extrusion head having a fixed-aperture extrusion port, which is formed in a process of starting from "point-to-line" linear deposition, then continuously assembling and filling a line to form a plane, and finally continuously assembling the plane to form a body, and problems needing to be solved by a "point-line-plane-body" conventional forming technology are: (1) a manufacturing process of three-dimensional (3D) part forming consumes long time and has low forming efficiency, and material extrusion capacity of the extrusion head becomes a bottleneck restricting an improvement of the forming efficiency; and (2) mechanical properties of a three-dimensional (3D) part are difficult to improve due to high porosity and low density of a three-dimensional (3D) part formed workpiece.

An extrusion-flow-adjustable three-dimensional printer nozzle with a publication number CN 204222625 U, a line scanning nozzle with a publication number CN 205167581 U and an extruder assembly member, with a publication number CN 107344419 A, for a three-dimensional object printer, which are published by National Intellectual Property Administration, PRC, each have an adjustable extrusion port that changes a length of an extrusion slit by driving at least one baffle block (or called as a baffle plate or piston), so as to output different extrusion flow, so as to effectively improve the forming efficiency. However, the technical solutions recorded in the above-mentioned three documents each have following problems needing to be solved: (1) a volume of a channel for accommodating a fluid material is changed with a movement of the baffle block (or called as the baffle plate or piston), which makes precise control of the extrusion flow complex and difficult, which will lead to a risk of a forming defect of over-accumulation or insufficient accumulation generated by the three-dimensional (3D) part, thereby seriously restricting forming quality and precision of the three-dimensional (3D) part; (2) in the process of the movement of the baffle block (or called as the baffle plate or piston) for reducing the extrusion flow, since a drive force and a friction force acting on the baffle block (or called as the baffle plate or piston) are a pair of opposite axial extrusion forces, the baffle block will generate the risk of radial bending deformation, and especially, the greater an adjustment range of the length of the extrusion slit of the above adjustable extrusion port is, the greater the risk and deformation amount of the radial deformation are, thereby affecting location precision of the baffle block (or called as the baffle plate or piston), thereby affecting the forming precision of the three-dimensional (3D) part; and (3) there is a flow stagnation region (dead region) in the channel, and long-term retention of a construction material in the channel will cause harm of deterioration of the construction material (such as carbonization of a polymer viscous fluid material, or a coarse crystal structure of an alloy material).

Solution of the Problem

Technical Solution

The objective of the present disclosure is to provides a slit-adjustable-type extrusion head used in an extrusion-based additive manufacturing system in order to solve the above problem. On one aspect, compared with a "point-to-line" liner deposition process of the traditional point extrusion head, the slit-adjustable-type extrusion head provides a "line-to-plane" planar deposition process, such that the forming efficiency is remarkably improved, and the three-dimensional (3D) part has large density and high strength; on the second aspect, the slit-type extrusion head has a structure for self-balancing a volume of a channel, such that the channel has a constant volume, thereby making control over extrusion flow simple; on the third aspect, for an elongated-rod-shaped sliding member, the slit-type extrusion head is constructed such that a drive force acting on a sliding part in the process of adjusting the length of an extrusion slit is an axial tensile force, apparently, the structure may prevent the sliding part, especially the elongated-rod-shaped sliding member from generating the risk of the radial bending deformation; and on the fourth aspect, the channel of the slit extrusion head has an annular channel structure for preventing a flow stagnation region from being formed, thereby avoiding of deterioration of the construction material due to long-time retention inside the channel.

In order to achieve the above objective, the present disclosure provides the following technical solution:

(1) The slit-adjustable-type extrusion head used in the extrusion-based additive manufacturing system includes: a body being provided with an adjusting slide groove extending in an axial direction of the body, a lower end in a radial direction of the adjusting slide groove penetrating a bottom surface of the body to be opened to an outside of the body, a radial direction being orthogonal to the axial direction, and the bottom surface being parallel to the axial direction; a core being provided with an adjusting slider that matches the adjusting slide groove in shape and is in sliding cooperation with the adjusting slide groove in a liquid-tight manner; at least one inlet that is constructed on the body or/and the core and used for receiving the construction material; a channel that is constructed by a volume space jointly defined by the body and the core and used for accommodating the construction material received by the at least one inlet; and a slit-type outlet that is formed at a bottom end of the channel, a boundary of the slit-type outlet being jointly defined by the adjusting slide groove and the adjusting slider, and the slit-type outlet being used for extruding the construction material, wherein the body further includes a balancing slide part that extends in the axial direction, is in communication with the channel, and is separated from the bottom surface of the body;

the core further includes a balancing adaptation part that matches the balancing slide part in shape and is in sliding cooperation with the balancing slide part in a liquid-tight manner;

the body and the core are held by a rack mechanism of the additive manufacturing system and operably slide in the axial direction relative to each other, thereby adjusting a slit length of the slit-type outlet in the axial direction; one of the adjusting slider and the balancing adaptation part moves into a volume space of the channel to occupy and compress the volume space of the channel, the other one of the adjusting slider and the balancing adaptation part moves out of the volume space of the channel to release and expand the volume space of the channel, and an occupation and compression amount and a release and expansion amount in a unit time are exactly equal, such that the channel has a constant volume.

(2) Further, according to the slit-adjustable-type extrusion head described in (1), a projection area of the balancing adaptation part in the axial direction is equal to a projection area of the adjusting slider in the axial direction.

(3) Further, according to the slit-adjustable-type extrusion head described in (2), the body further includes a body interval recess that is arranged between the adjusting slide groove and the balancing slide part and in connection with the adjusting slide groove and the balancing slide part, and a radial gap interval is provided between the body interval recess and the core and forms a part of the channel.

(4) Further, according to the slit-adjustable-type extrusion head described in (2), the core further includes a core interval recess that is arranged between the adjusting slider and the balancing adaptation part and in connection with the adjusting slider and the balancing adaptation part, and a radial gap interval is provided between the core interval recess and the body and forms a part of the channel.

(5) Further, according to the slit-adjustable-type extrusion head described in (3) or (4), the radial gap interval is at least partially constructed to form an annular channel, and a surrounding axis of the annular channel is orthogonal to the axial direction.

(6) Further, according to the slit-adjustable-type extrusion head described in (1), the adjusting slide groove includes: a slit part extending upwards from the bottom surface of the body and an auxiliary part extending from an upper end of the slit part along the radial direction;

the adjusting slider includes: a slit adaptation part that matches the slit part in shape and is in sliding cooperation with the slit part in a liquid-tight manner, and an auxiliary adaptation part that matches the auxiliary part in shape and is in sliding cooperation with the auxiliary part in a liquid-tight manner;

a projection of the slit adaptation part in the axial direction is in a shape of a rectangle or a horn mouth with a wider upper part and a narrower lower part, and a geometric shape presented by a projection of the auxiliary adaptation part in the axial direction includes a polygon, a circle, an ellipse, an arch or a combination of the polygon, the circle, the ellipse and the arch; and a geometric shape presented by a projection of the balancing adaptation part in the axial direction includes a polygon, a circle, an ellipse, an arch, or a combination of the polygon, the circle, the ellipse and the arch.

(7) Further, according to the slit-adjustable-type extrusion head described in (6), an projection of the balancing adaptation part in the axial direction completely covers the projection of the auxiliary adaptation part in the axial direction, and a geometric shape presented by a difference set between the projection of the balancing adaptation part in the axial direction and the projection of the auxiliary adaptation part in the axial direction includes a polygon, a circular ring, an arch or a crescent.

(8) Further, according to the slit-adjustable-type extrusion head described in (3), the adjusting slider and the balancing adaptation part are constructed as an integrated sheet body, a projection of the adjusting slider in the axial direction and the projection of the balancing adaptation part in the axial direction are constructed as congruent rectangles offset by a set distance in a vertical direction, and the vertical direction is orthogonal to the axial direction.

(9) Further, according to the slit-adjustable-type extrusion head described in (1), an axial tensile force operably acting on an outer end of the core in the axial direction drives the core and the body to slide bidirectionally in the axial direction relative to each other.

(10) Further, according to the slit-adjustable-type extrusion head described in (1), the body is constructed by combining two half dies into a whole.

(11) Further, according to the slit-adjustable-type extrusion head described in (1), axial side end surfaces of the adjusting slide groove and the adjusting slider defining the axial boundary of the slit-type outlet are provided with inwardly expanding flow promoting bevels, an included angle between each of the flow promoting bevels and a vertical direction forms a flow promoting angle $\alpha$, and the flow promoting angle $\alpha$ preferrably ranges from 3° to 10°.

(12) Further, the slit-adjustable-type extrusion head described in (1), further includes a heating unit arranged adjacent to the channel so as to melt the construction material accommodated in the channel into molten flow or to maintain a molten flow to at least an extrudable state, where a heating manner of the heating unit includes resistance heating or induction heating.

(13) Further, according to the slit-adjustable-type extrusion head described in (1), the bottom surface of the body and a bottom surface of the core have coatings, and a material of each of the coatings and the construction material have poor wettability.

(14) A additive manufacturing system device having a slit-adjustable-type extrusion head uses the at least one slit-adjustable-type extrusion head according to (1).

(15) Further, the additive manufacturing system device with the slit-adjustable-type extrusion head described in (14) further includes the following units:

at least one construction material supply unit including a roller type construction material supply unit, a screw extrusion feeding type construction material supply unit, and a metering feed pump type construction material supply unit;

a basic construction platform unit that works close to a position below the slit-type outlet of the slit-adjustable-type extrusion head and is used for bearing the three-dimensional (3D) part; and a rack mechanism unit used for holding and driving the slit-adjustable-type extrusion head so as to make the slit-adjustable-type extrusion head and the basic construction platform unit move, relative to each other, along three dimensions of "X", "Y" and "Z" axes in a rectangular coordinate system according to an instruction, to make the body and the core of the slit-adjustable-type extrusion head slide, relative to each other, in the "X" axis according to the instruction, and to further make the slit-adjustable-type extrusion head and the basic construction platform unit horizontally rotate, relative to each other, with the "Z"-axis as an axis according to the instruction. Further, the whole additive manufacturing system device may rotate with the "Y" axis as an axis according to the instruction.

The rack mechanism unit includes a driving device, a transmission device and a guiding device, where the driving device includes a stepping motor, a servo motor or a linear motor, the transmission device includes a synchronous belt transmission device, a rope transmission device, a spiral transmission device, a gear transmission device or a linear motor transmission device, and the guiding device includes a linear sliding rail.

Beneficial Effects of the Disclosure

Beneficial Effects

The present disclosure may provide the slit-adjustable-type extrusion head. The slit-adjustable-type extrusion head has a simple structure and the constant volume of the channel, may basically achieve precise control of the extrusion flow, and has high adjustment location precision, the construction material has stable physical and chemical properties, and the additive manufacturing system using the slit-adjustable-type extrusion head may remarkably improve the forming efficiency, the forming quality and the mechanical properties of the three-dimensional (3D) part.

DETAILED DESCRIPTION OF THE EMBODIMENTS

Figure 1A:
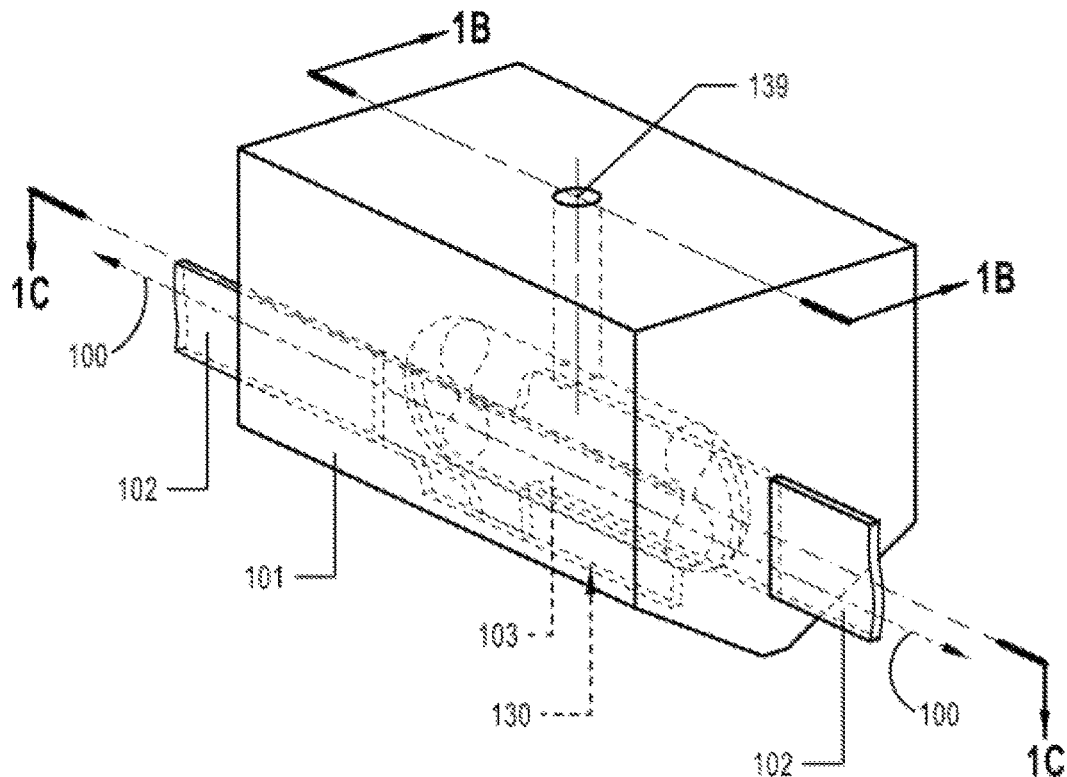
FIG. 1A is a front stereogram of Embodiment 1 of a slit-adjustable-type extrusion head of the present disclosure.

The technical solutions of the present disclosure will be described below in conjunction with drawings. Apparently, the embodiments described are merely some rather than all of the embodiments of the present disclosure. Based on the embodiments of the present disclosure, all other embodiments obtained by those of ordinary skill in the art without making creative efforts fall within the scope of protection of the present disclosure.

It is to be understood that, unless otherwise specified, the following terms used in the present disclosure have the meanings provided below:

the terms "axial direction" and "axis" represent the direction in which a slide groove and a slider slide relative to each other, and this terms do not require a concentric axis, may be applied to a cylindrical slide groove and slider, and further may be applied to a non-cylindrical slide groove and slider whose cross-sectional shapes include an ellipse, a polygon, an arch or a combination thereof.

The terms "communication" and "connection" should be understood broadly and may be, for example, a fixed connection, a detachable connection, or an integral connection; a mechanical connection, and an electrical connection; a direct mutual connection, an indirect mutual connection by means of one or more additional intermediate parts arranged therebetween, and a communication between interiors of two elements. Specific meanings of the above terms in the present disclosure may be understood in accordance with specific conditions for those of ordinary skill in the art.

The term "instruction" represents that a control signal is directly and/or indirectly relayed from a controller assembly to a device so as to make the device operate in accordance with a relayed signal. The signal may be relayed in any form, for example, a communication signal to a microprocessor on the device is relayed to an operation device, etc by applying power.

The terms "preferred", "preferably", "suitable" and "suitably" represent embodiments of the present disclosure that may, in some conditions, provide some benefits. However, other embodiments may be preferred or exemplary in the same or other conditions. In addition, the detailed description of one or more preferred or exemplary embodiments does not imply that other embodiments are not feasible, and does not represent that other embodiments are excluded from the scope of the present disclosure.

Orientations or position relations indicated by the terms "length", "width", "thickness", "height", "up", "down", "front", "rear", "left", "right", "vertical", "horizontal", "top", "bottom", "inside", "outside", "center", "longitudinal", "transverse", "axial", "radial", "circumferential", etc. are based on orientations or position relations shown in the drawings, which is only for the convenience of describing the present disclosure and simplifying the description, rather than indicating or implying that the device or elements referred to must have a specific orientation, be constructed and operated in a specific orientation, and thus the terms may not be understood as a limitation of the present disclosure.

The terms "about" and "basically" are used herein for representing measurable values and ranges due to expected variations (for example, limitations and variability of measurements) known to those skilled in the art.

The term "arch" represents a graph consisting of a chord and an arc to which it subtends, one chord on a circle divides the circle into two parts, both of which are called as an arch, when the arc of the arch is less than a semicircle, a term name is "inferior arch", and when the arc of the arch is greater than the semicircle, the term name is "superior arch".

The term "difference set" is a set consisting of all elements that belong to set A and not to set B, which is called as a difference set of set A and set B (or set A minus set B), and is recorded as A−B, that is, A−B={x|x∈A, ㅂ x∉B'}.

In order to simplify description and facilitate understanding, reference numeral lines shown in dashed lines in the drawings represent to point to parts that are hidden in the drawings.

FIGS. 1A-1F show Embodiment 1 of a slit-adjustable-type extrusion head of the present disclosure, FIG. 1A is a front stereogram of Embodiment 1, and as shown in FIG. 1A, the slit-adjustable-type extrusion head includes: a body 101 and a core 102 which operably slide along an axis 100 relative to each other, an inlet 139 that is provided on the body 101, externally connected to a material supply device (not shown in the figure) of an additive manufacturing system and used for receiving a construction material, a channel 103 that is jointly defined by the body 101 and the core 102 and used for accommodating the construction material received by the inlet 139, and a slit-type outlet 130 that is located at a bottom end of the channel 103 and used for extruding the sheet-shaped or film-shaped construction material.

Figure 1B:
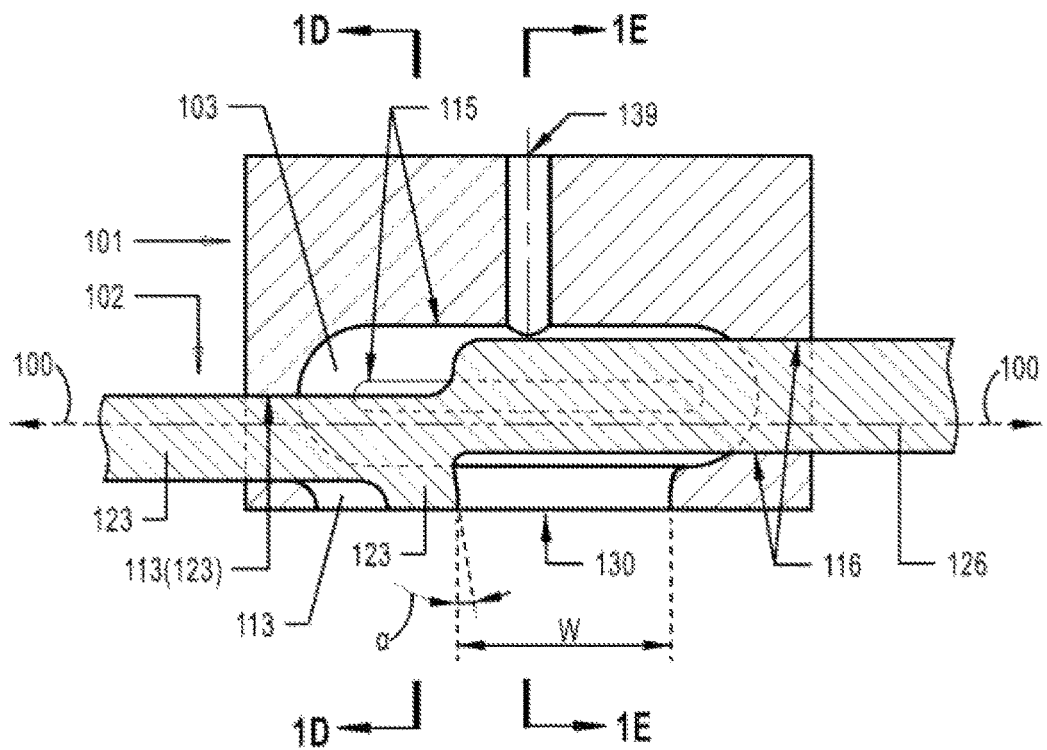
FIG. 1B is a section view of a cross section 1B-1B cut in FIG. 1A.
Figure 1C:
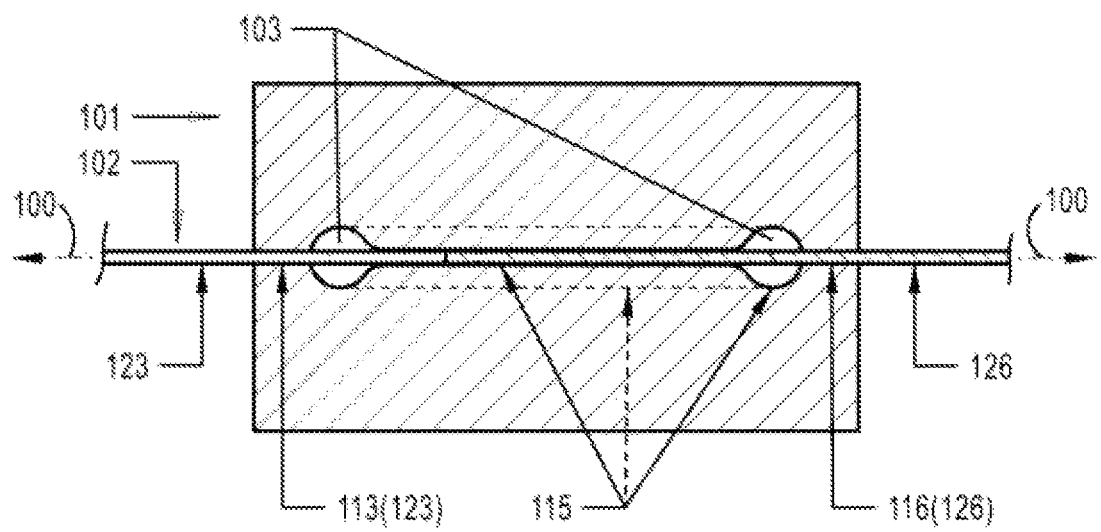
FIG. 1C is a section view of a cross section 1C-1C cut in FIG. 1A.
Figure 1D:
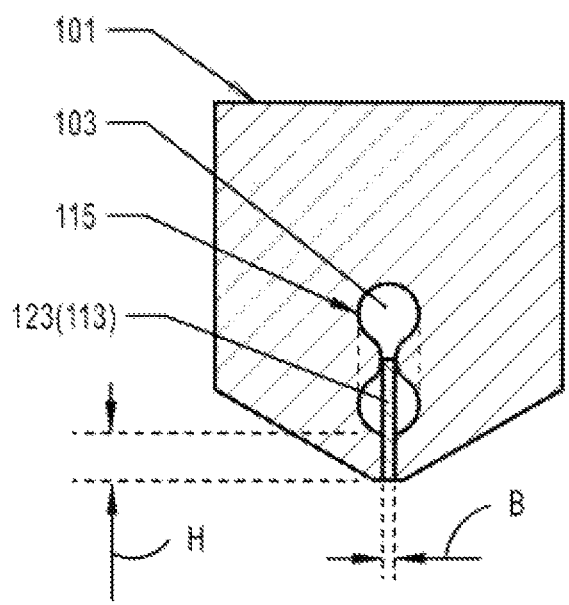
FIG. 1D is a section view of a cross section 1D-1D cut in FIG. 1B.
Figure 1E:
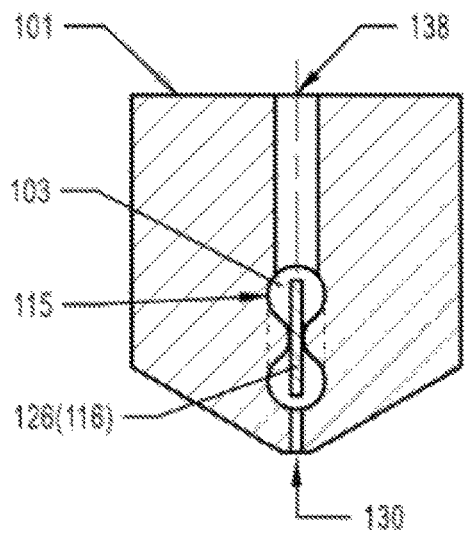
FIG. 1E is a section view of a cross section 1E-1E cut in FIG. 1B.

FIGS. 1B and 1C are section views of cross sections 1B-1B and 1C-1C cut in FIG. 1A respectively. FIGS. 1D and 1E are section views of cross section 1D-1D and 1E-1E cut in FIG. 1B respectively. With reference to FIGS. 1B-1E, the body 101 further has an adjusting slide groove 113 extending along an axis 100 of the body, a lower end in a radial direction of the adjusting slide groove penetrating a bottom surface of the body 101 to be opened to the outside of the body, a balancing slide part 116 that extends along the axis 100 and is separated from the bottom surface of the body 101, and a body interval recess 115 that is arranged between the balancing slide part 116 and the adjusting slide groove 113 and in connection with the balancing slide part 116 and the adjusting slide groove 113; the core 102 has an adjusting slider 123 that matches the adjusting slide groove 113 in shape and is in sliding cooperation with the adjusting slide groove in a liquid-tight manner, and a balancing adaptation part 126 that matches the balancing slide part 116 in shape and is in sliding cooperation with the balancing slide part in a liquid-tight manner; and the adjusting slider 123 and the balancing adaptation part 126 are constructed as an integrated sheet body, and the projection of the adjusting slider 123 in the axial direction and the projection i of the balancing adaptation part 126 n the axial direction are constructed as congruent rectangles offset by a set distance in a vertical direction.

The body interval recess 115 is constructed as an annular groove structure and a radial gap interval is formed between the body interval recess 115 and the core 102, the radial gap interval forms a part of the channel 103 and forms an annular channel in a central region of the channel 103, a surrounding axis of the annular channel is orthogonal to the axis 100, and the annular channel structure has a beneficial effect of preventing a short circuit or an obvious local flow stagnation region from being formed inside the channel.

The slit-type outlet 130 is jointly defined by the adjusting slide groove 113 and the adjusting slider 123, and the body 101 and the core 102 are held by a rack mechanism (not shown in the figure) of the additive manufacturing system, and operably slide along the axis 100 relative to each other under an action of an axial tensile force acting on an outer end of the core 102, thereby dynamically adjusting a slit length W (as shown in FIG. 1B) of the slit-type outlet 130; and one of the adjusting slider 123 and the balancing adaptation part 126 moves into a volume space of the channel 103 and occupies and compresses the volume space of the channel 103, the other one thereof moves out of the volume space of the channel 103 and releases and expands the volume space of the channel 103, and since the adjusting slider 123 and the balancing adaptation part 126 are constructed to have an equal projection area in the axial direction, a compression amount and an expansion amount in a unit time are exactly equal, and the channel 103 has a constant volume.

A direction of an arrow of the axis 100 in FIG. 1B represents a movement direction in which the body 101 and the core 102 slide relative to each other, a direction of the axial tensile force acting on the outer end of the core 102 is consistent with the movement direction shown by the arrow of the axis 100 in FIG. 1B, and a construction solution using the axial tensile force to drive an elongated-rod-shaped sliding member has a beneficial effect of being capable of preventing the core 102 from generating a risk of radial bending deformation.

As shown in FIG. 1B, axial side end surfaces of the adjusting slide groove 113 and the adjusting slider 123 defining an axial boundary of the slit-type outlet 130 have inwardly expanding flow promoting bevels, an included angle between the flow promoting bevel and the vertical direction forms a flow promoting angle α (FIG. 1B only shows the flow promoting angle α of one side), and the flow prompting angle α preferably ranges from 3° to 10°; and a dynamic adjustment range of the slit length W of the slit-type outlet 130 is Wmax to Wmin, Wmax preferably ranges from 1 mm to 4000 mm, a range of Wmax preferably ranges from 20 mm to 200 mm, Wmin preferably ranges from 0 to 0.5 mm, and Wmin is preferably 0; and as shown in FIG. 1D, the adjusting slide groove 113 has a slit width B and a slit height H, the slit width B preferably ranges from 0.01 mm to 5 mm, and the slit width B preferably ranges from 0.1 mm to 0.4 mm; and a suitable ratio of the slit height H to the slit width B is 2 to 20, and a ratio of the slit height H to the slit width B preferably ranges from 4 to 10.

It should be noted that the above description about the axial tensile force acting on the outer end of the core 102 is also applicable to second embodiment to seventh embodiment of the present disclosure, the above description about the flow promoting angle α, the slit length W, the slit width B and the slit height H is also applicable to other embodiments of the present disclosure, the same reference numeral is used in the drawings of other embodiments, and in order to simplify the description, the description will not be repeated in other embodiments described later.

Figure 1F:
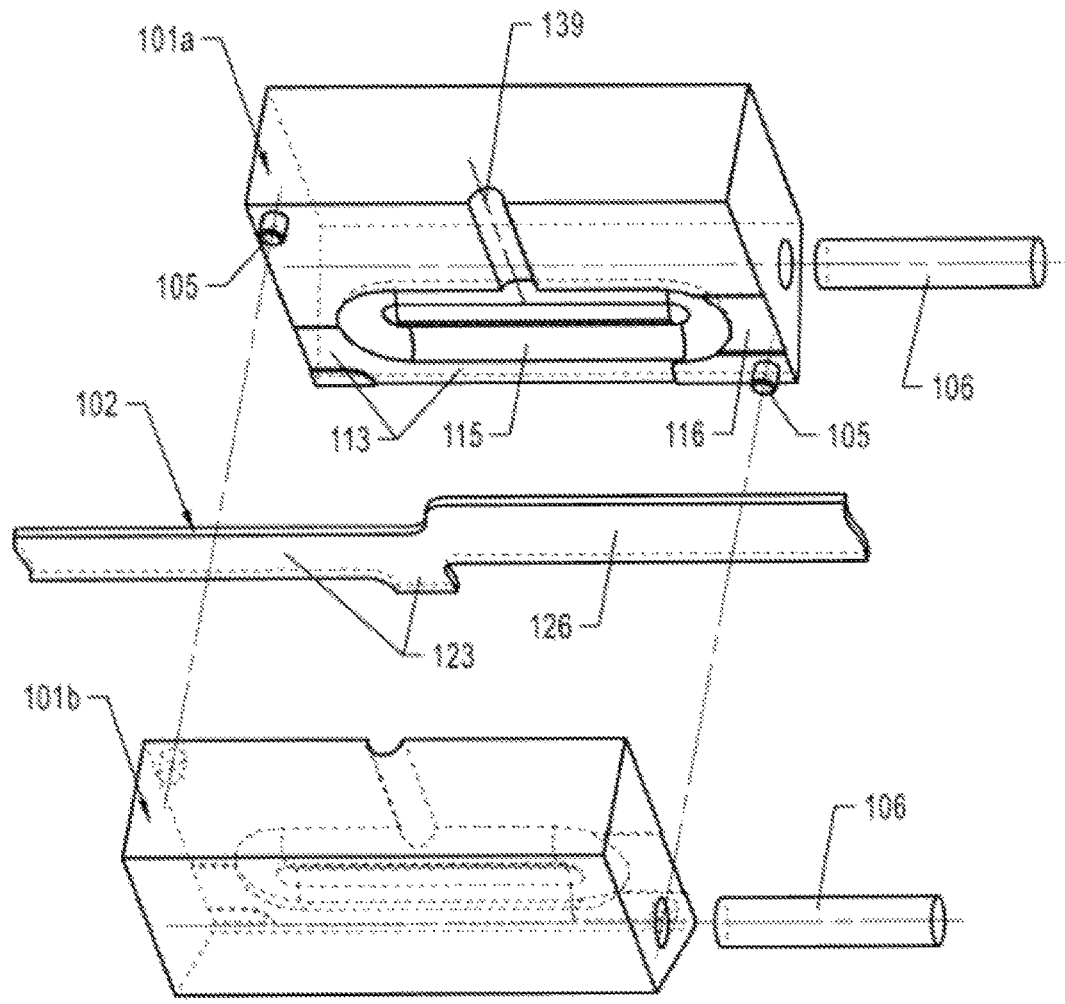
FIG. 1F is an exploded stereogram of Embodiment 1, and shows that a body is constructed by combining two half dies that are vertically split into a whole.

FIG. 1F is an exploded stereogram of Embodiment 1, and as shown in FIG. 1F, the body 101 is constructed by combining half dies 101*a* and 101*b* into a whole by a locating pin 105 and a fastening connector (not shown in the figure); the figure shows a resistance-type heating unit 106 so as to melt the construction material accommodated in the channel 103 into molten flow or to maintain the molten flow to at least an extrudable state; and in other optional embodiments, a heating manner of the heating unit 106 further includes induction heating.

Figure 2A:
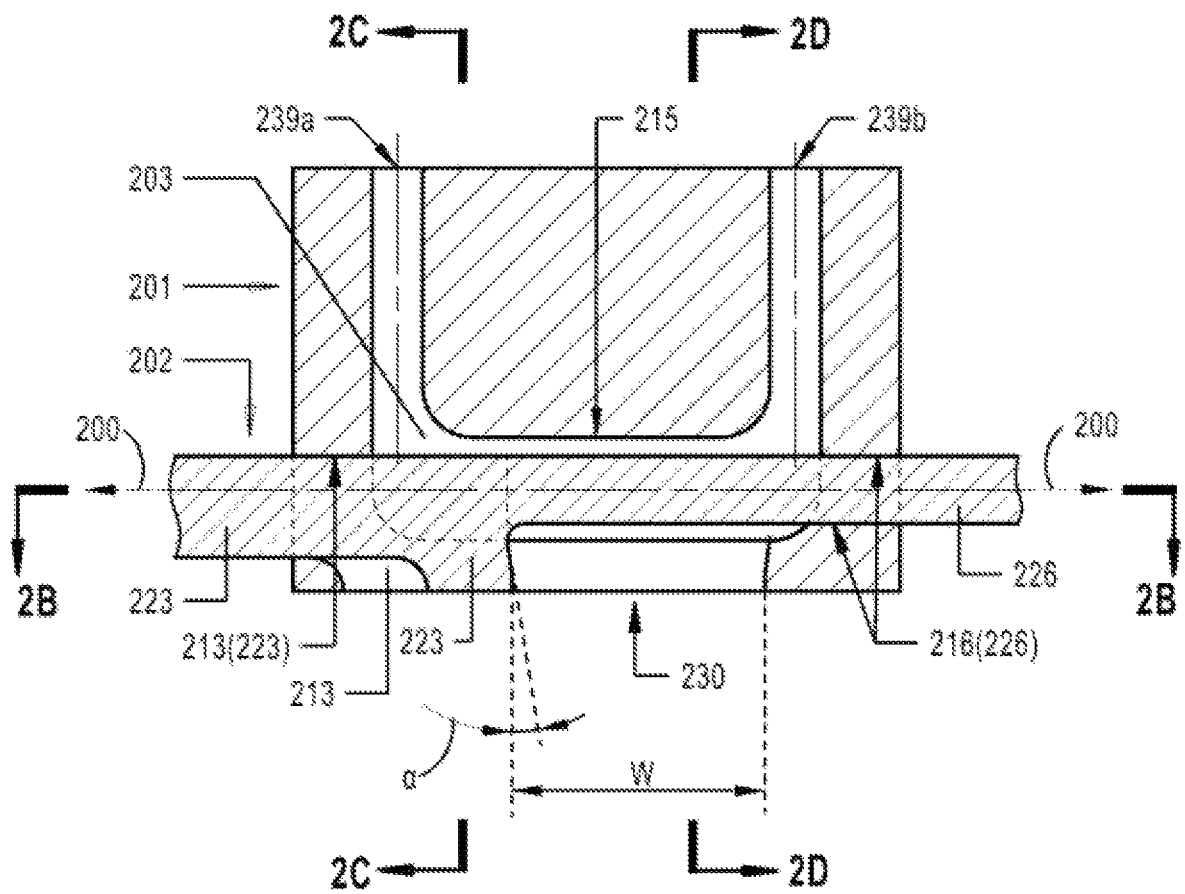
FIG. 2A is a front section view of Embodiment 2 of a slit-adjustable-type extrusion head of the present disclosure.
Figure 2B:
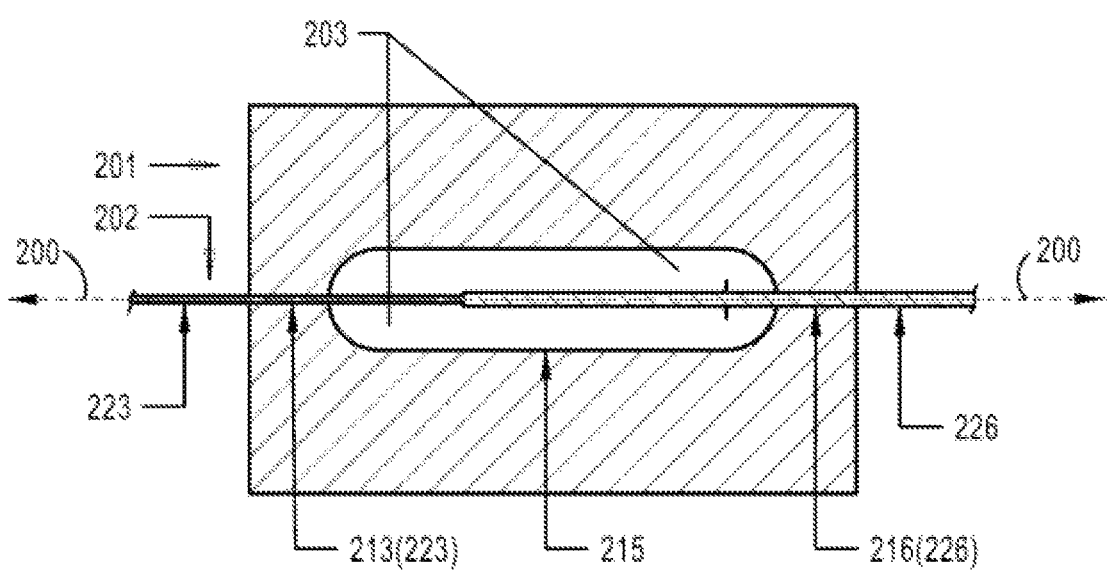
FIG. 2B is a section view of a cross section 2B-2B cut in FIG. 2A.
Figure 2C:
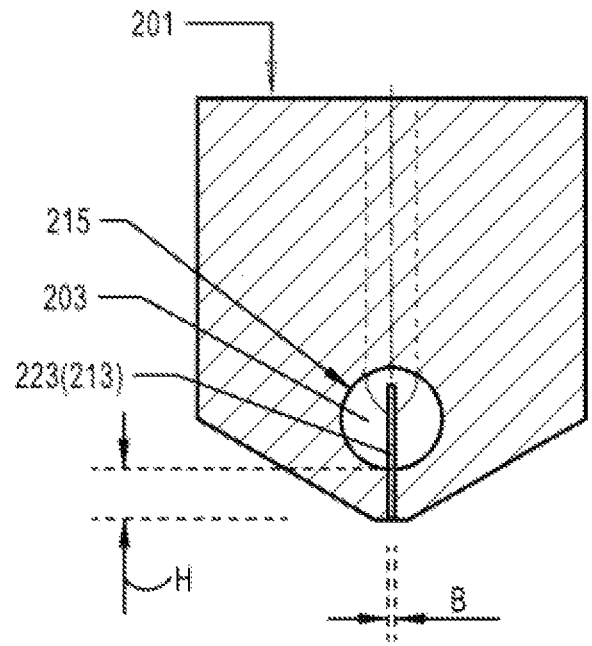
FIG. 2C is a section view of a cross section 2C-2C cut in FIG. 2A.
Figure 2D:
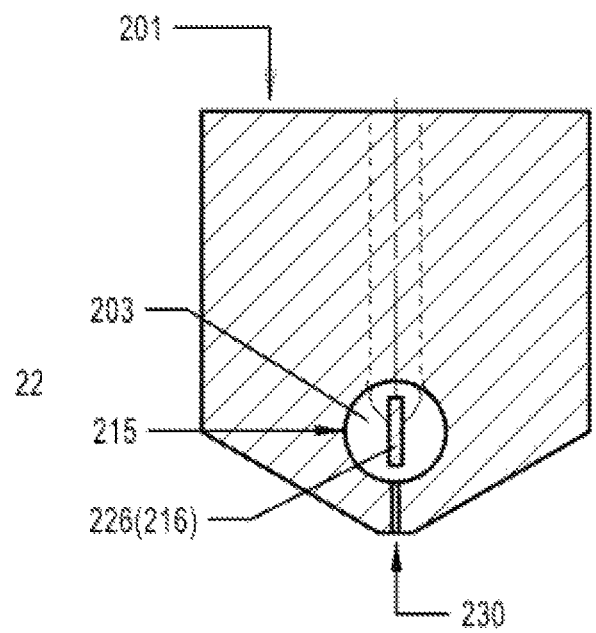
FIG. 2D is a section view of a cross section 2D-2D cut in FIG. 2A.

FIGS. 2A-2D show Embodiment 2 of a slit-adjustable-type extrusion head of the present disclosure, FIG. 2A is a front section view of Embodiment 2, FIGS. 2B, 2C and 2D are section views of cross sections 2B-2B, 2C-2C and 2D-2D cut in FIG. 2A respectively, the embodiment shows an optional embodiment of Embodiment 1, where a corresponding reference numeral is added with "100", Embodiment 2 is similar to Embodiment 1, except for following differences: two inlets, that is, an inlet 239*a* and an inlet 239*b* are provided on the body 201, a body interval recess 215 is constructed as a shape of a manifold, the inlets 239*a* and 239*b* extend inwards to be in communication with two axial ends of the body interval recess 215, an arrangement of the two inlets improves, on the one hand, extrusion capacity of the slit-adjustable-type extrusion head, and on the other hand, the two inlets, the manifold-shaped body interval recess 215 and a material supply device not shown in the figures jointly form an annular channel substantially, and the annular channel still has a beneficial effect of preventing a short circuit or an obvious local flow stagnation region from being formed inside the channel; and optionally, in this embodiment, a thickness of a balancing adaptation part 226 is increased, a height of the balancing adaptation part is reduced, and the balancing adaptation part has a beneficial effect that a radial size of the slit-adjustable-type extrusion head tends to be compact.

Figure 3A:
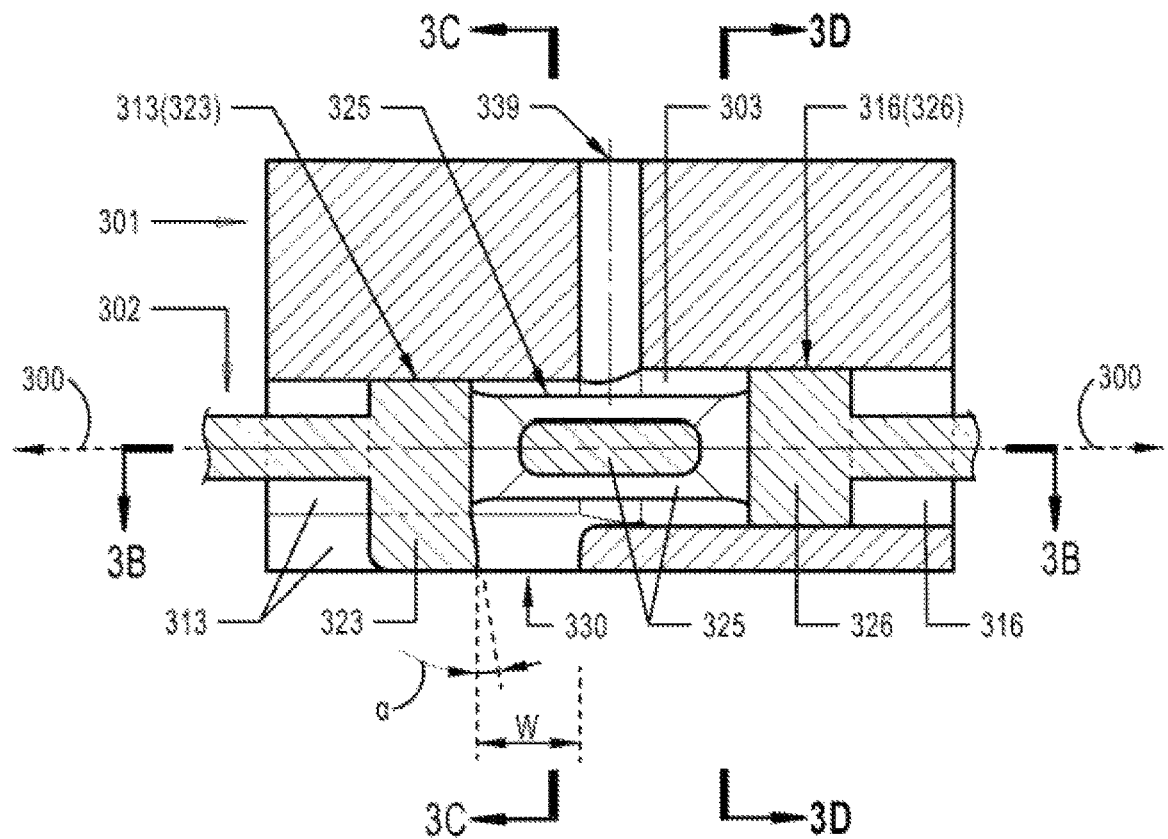
FIG. 3A is a front section view of Embodiment 3 of a slit-adjustable-type extrusion head of the present disclosure.
Figure 3B:
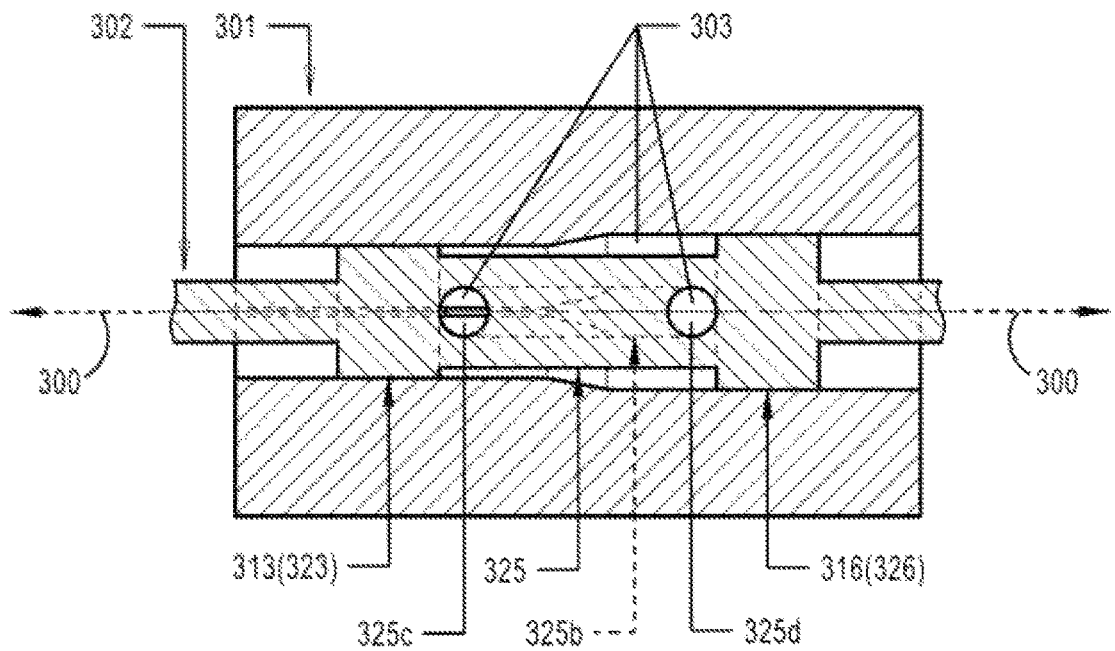
FIG. 3B is a section view of a cross section 3B-3B cut in FIG. 3A.
Figure 3C:
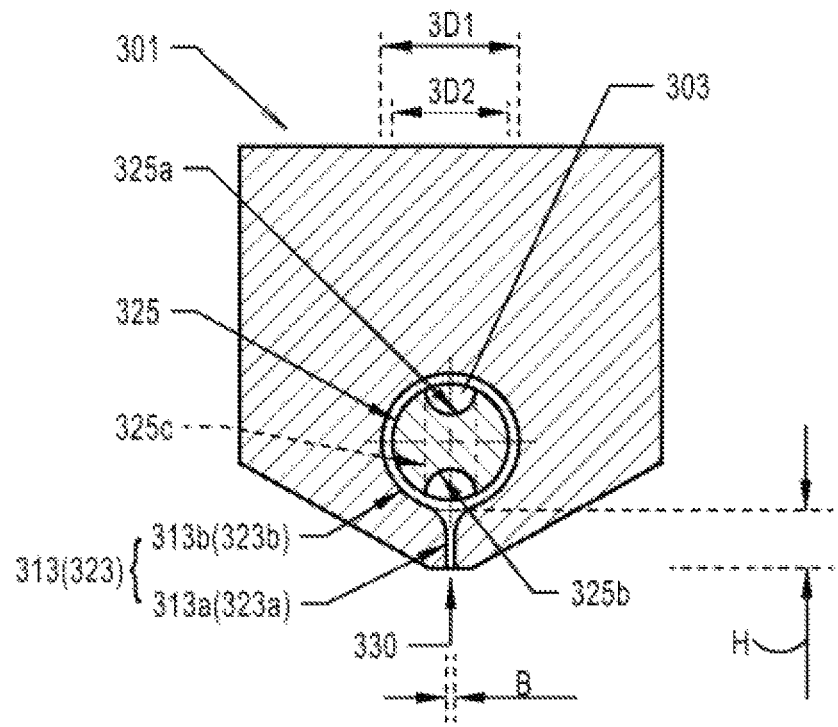
FIG. 3C is a section view of a cross section 3C-3C cut in FIG. 3A.
Figure 3D:
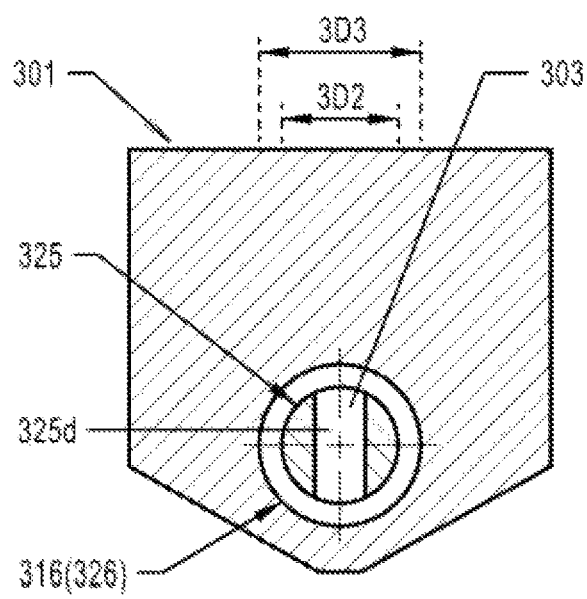
FIG. 3D is a section view of a cross section 3D-3D cut in FIG. 3A.

FIGS. 3A-3G show Embodiment 3 of a slit-adjustable-type extrusion head of the present disclosure, FIG. 3A is a front section view of Embodiment 3, and FIGS. 3B, 3C and 3D are section views of cross sections 3B-3B, 3C-3C and 3D-3D cut in FIG. 3A respectively. With reference to FIGS. 3A-3D, the slit-adjustable-type extrusion head includes: a body 301 and a core 302 which operably slide along an axis 300 relative to each other, an inlet 339 that is provided on the body 301, externally connected to a material supply device (not shown in the figures) of an additive manufacturing system and used for receiving a construction material, a channel 303 that is jointly defined by the body 301 and the core 302 and used for accommodating a construction material received by the inlet 339, and a slit-type outlet 330 that is located at a bottom end of the channel 303 and used for extruding the sheet-shaped or film-shaped construction material.

The body 301 further has an adjusting slide groove 313 extending along the axis 300, a lower end in a radial direction of the adjusting slide groove penetrating a bottom surface of the body 301 to be opened to the outside of the body, a balancing slide part 316 that extends along the axis 300 and is separated from a bottom surface of the body 301;

the core 302 has an adjusting slider 323 that matches the adjusting slide groove 313 in shape and is in sliding cooperation with the adjusting slide groove in a liquid-tight manner, a balancing adaptation part 326 that matches the balancing slide part 316 in shape and is in sliding cooperation with the balancing slide part in a liquid-tight manner, and a core interval recess 325 that is arranged between the balancing adaptation part 326 and the adjusting slide groove 323 and in connection with the balancing adaptation part and the adjusting slider.

The balancing adaptation part 326 is constructed as a cylinder with a diameter of 3D3 (as shown in FIG. 3D); the core interval recess 325 is constructed as an incomplete cylinder concentric with the balancing adaptation part 326, the core interval recess 325 has an upper groove 325a, a lower groove 325b and through holes 325c and 325d communicating the upper groove 325a and the lower groove 325b, a radial gap interval formed by the groove and the through hole mentioned above forms a part of the channel 303 and forms an annular channel in a central region of the channel 303, a surrounding axis of the annular channel is orthogonal to the axis 300, and the annular channel has a beneficial effect of preventing a short circuit or an obvious local flow stagnation region from being formed inside the channel.

The slit-type outlet 330 is jointly defined by the adjusting slide groove 313 and the adjusting slider 323, and the body 301 and the core 302 are held by a rack mechanism (not shown in the figures) of the additive manufacturing system, and operably slide along the axis 300 relative to each other under an action of an axial tensile force acting on an outer end of the core 302, thereby dynamically adjusting a slit length W (shown in FIG. 3A) of the slit-type outlet 330; and one of the adjusting slider 323 and the balancing adaptation part 326 moves into a volume space of the channel 303 to occupy and compress the volume space of the channel, the other one of the adjusting slider and the balancing adaptation part moves out the volume space of the channel 303 to release and expand the volume space of the channel, and the adjusting slider 323 and the balancing adaptation part 326 are constructed to have an equal axial projection area along the axis 300, such that a compression amount and an expansion amount in a unit time are exactly equal, and the channel 303 has a constant volume.

Figure 3E:
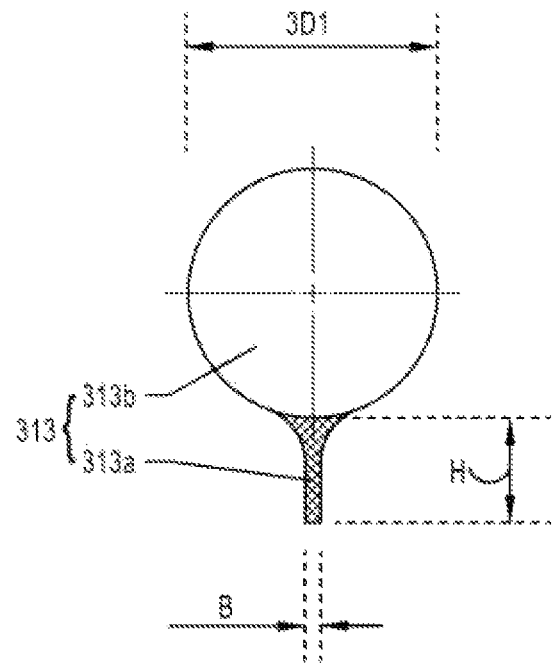
FIG. 3E is an enlarged view of a projection of an adjusting slider in an axial direction of Embodiment 3, and shows a slit adaptation part in a shaded part.
Figure 3F:
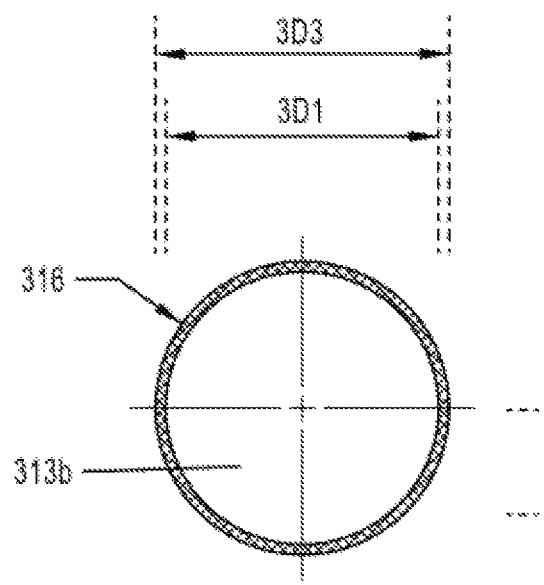
FIG. 3F is an enlarged view of projections of a balancing adaptation part and an auxiliary adaptation part in the axial direction of Embodiment 3, and shows that a difference set between the projection of the balancing adaptation part in the axial direction and the projection of the auxiliary adaptation part in the axial direction is in a shape of a circular ring.

Further, as shown in FIG. 3C, the adjusting slide groove 313 includes a slit part 313a extending upwards from the bottom surface of the body 301 and an auxiliary part 313b extending in a radial direction from an upper end of the slit part 313a, and the adjusting slider 323 includes a slit adaptation part 323a that matches the slit part 313a in shape and is in sliding cooperation with the slit part in a liquid-tight manner, and an auxiliary adaptation part 323b that matches the auxiliary part 313b in shape and is in sliding cooperation with the auxiliary part in a liquid-tight manner, the auxiliary adaptation part 323b is constructed as a cylinder concentric with the balancing adaptation part 326, and a diameter 3D1 of the auxiliary adaptation part 323b is only greater than a diameter 3D2 of the core interval recess 325 by 0.001 mm to 1 mm; FIG. 3E shows an enlarged view of a projection of the adjusting slider 323 in an axial direction along the axis 300, a projection of the slit adaptation part 323a in an axial direction is shown as a shaded part in FIG. 3E, the projection of the slit adaptation part 323a in the axial direction is in a shape of a horn mouth with a wider upper part and a narrower lower part, and a projection of the auxiliary adaptation part 323b in an axial direction is shown as a non-shaded part in FIG. 3E; and FIG. 3F shows an enlarged view of axial projections of the balancing adaptation part 326 and the auxiliary adaptation part 323b along the axis 300, the projection of the balancing adaptation part 326 in the axial direction completely covers the projection of the auxiliary adaptation part 323b in the axial direction, and a difference set between the projections of the balancing adaptation part 326 and the auxiliary adaptation part 323b in the axial direction is in the shape of a circular ring (a shaded part in FIG. 3F).

Figure 3G:
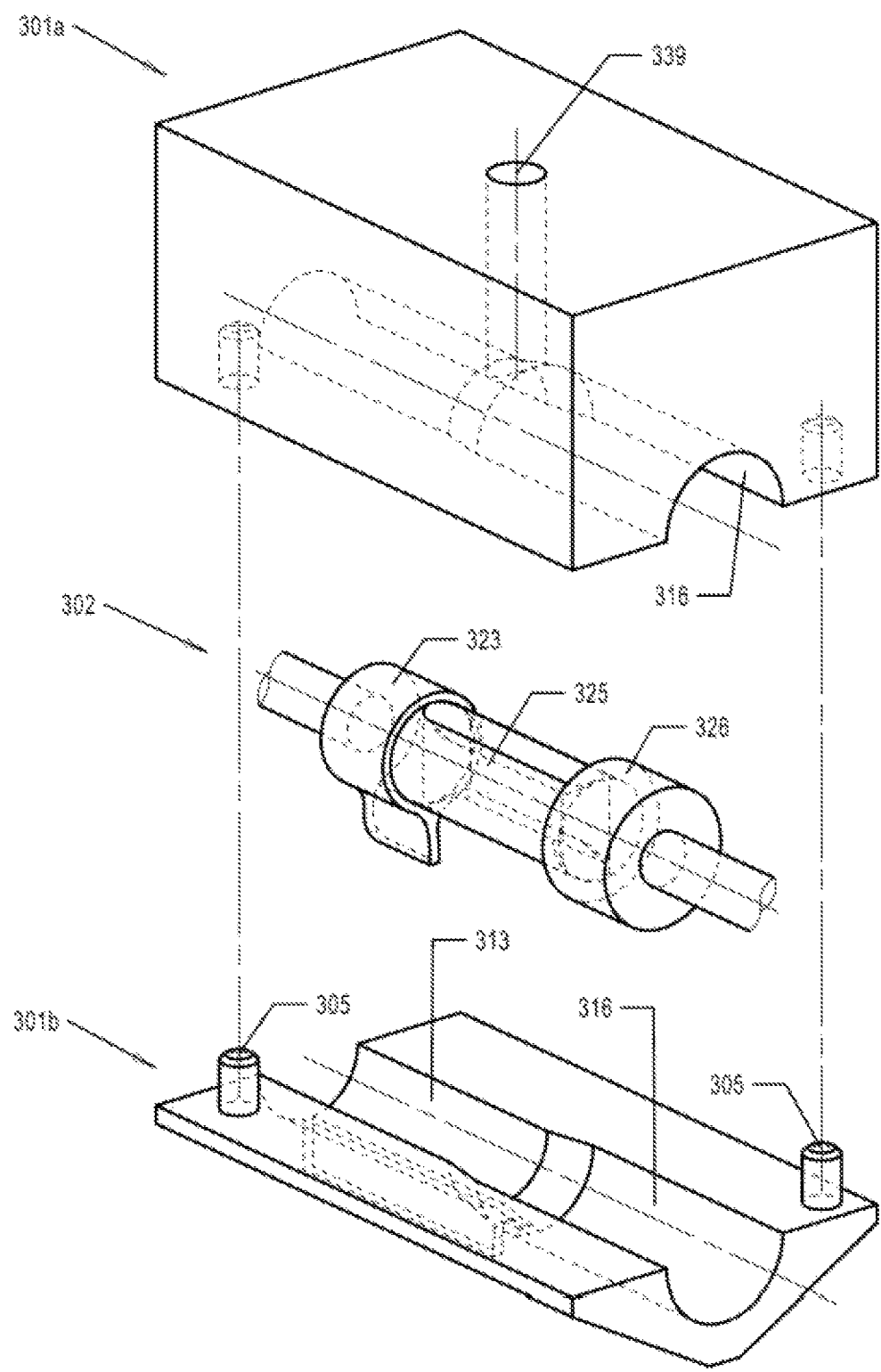
FIG. 3G is an exploded stereogram of Embodiment 3, and shows that a body is constructed by combining two half dies that are vertically split into a whole.

FIG. 3G is an exploded stereogram of Embodiment 3, and as shown in FIG. 3G, the body 301 is constructed by combining half dies 301a and 301b into a whole by a locating pin 305 and a fastening connector (not shown in the figure).

Figure 4A:
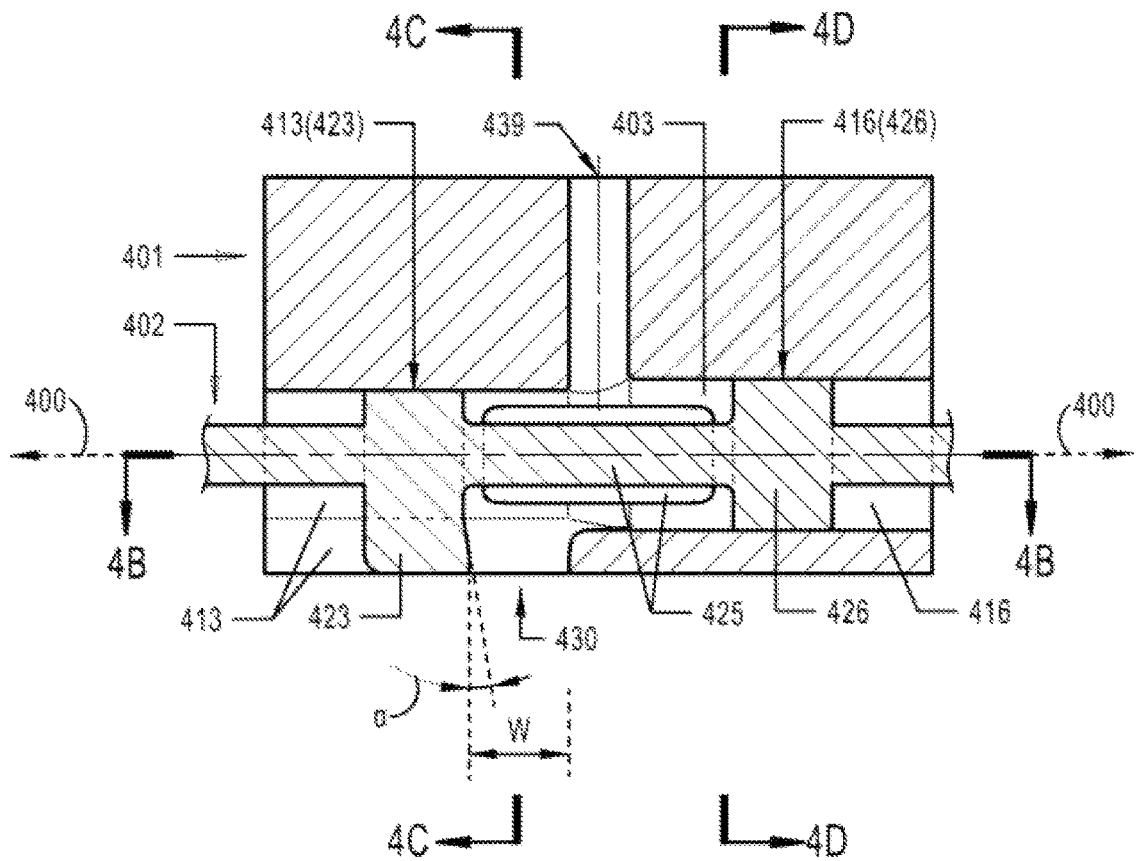
FIG. 4A is a front section view of Embodiment 4 of a slit-adjustable-type extrusion head of the present disclosure.
Figure 4B:
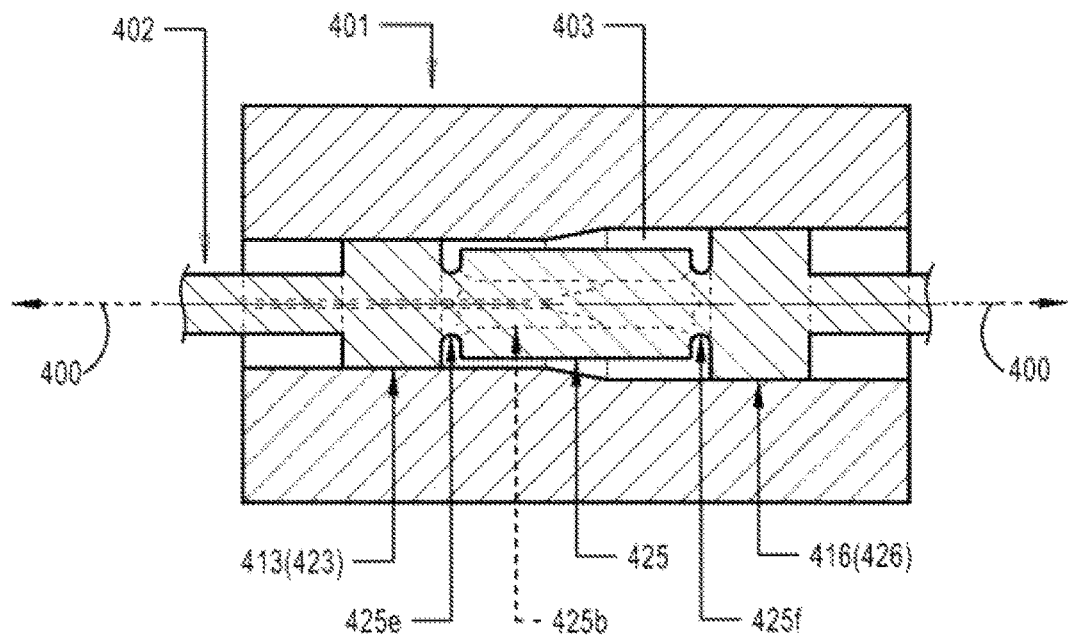
FIG. 4B is a section view of a cross section 4B-4B cut in FIG. 4A.
Figure 4C:
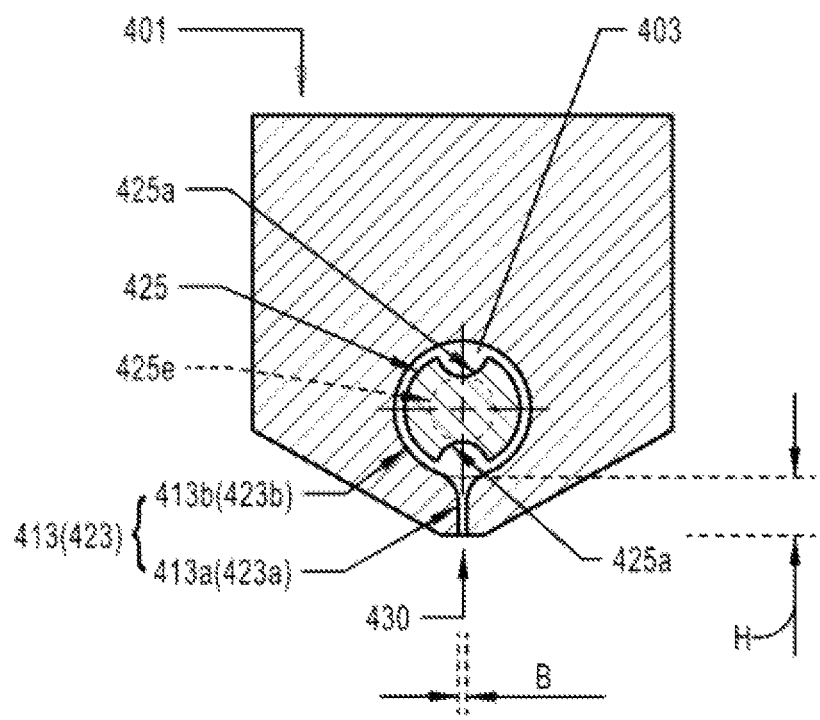
FIG. 4C is a section view of a cross section 4C-4C cut in FIG. 4A.
Figure 4D:
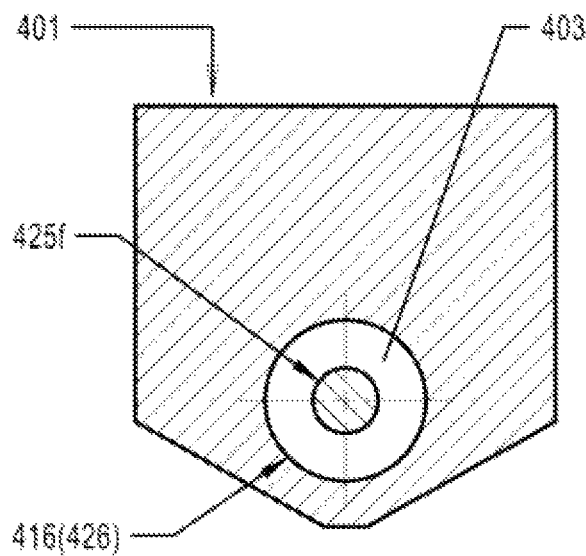
FIG. 4D is a section view of a cross section 4D-4D cut in FIG. 4A.

FIGS. 4A-4D show Embodiment 4 of the slit-adjustable-type extrusion head of the present disclosure, FIG. 4A is a front section view of Embodiment 4, and FIGS. 4B, 4C and 4D are section views of cross sections 4B-4B, 4C-4C, 4D-4D cut in FIG. 4A respectively. The embodiment shows an optional embodiment of Embodiment 3, where a corresponding reference numeral "100" is added compared with Embodiment 3. With reference to FIGS. 4A-4D, Embodiment 4 is similar to Embodiment 3, except for following differences: the through holes 325c and 325d corresponding to Embodiment 3 are replaced with annular grooves 425e and 425f respectively for communicating an upper groove 425a and a lower groove 425b.

Figure 5A:
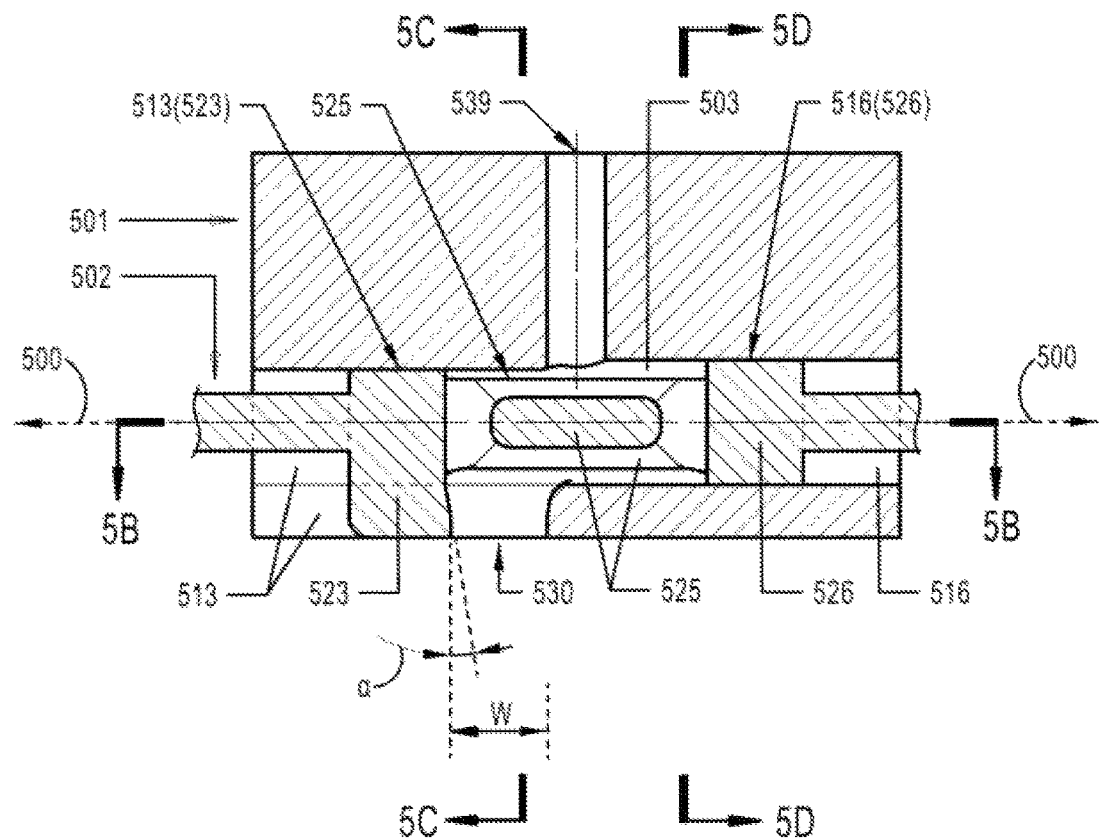
FIG. 5A is a front section view of Embodiment 5 of a slit-adjustable-type extrusion head of the present disclosure.
Figure 5B:
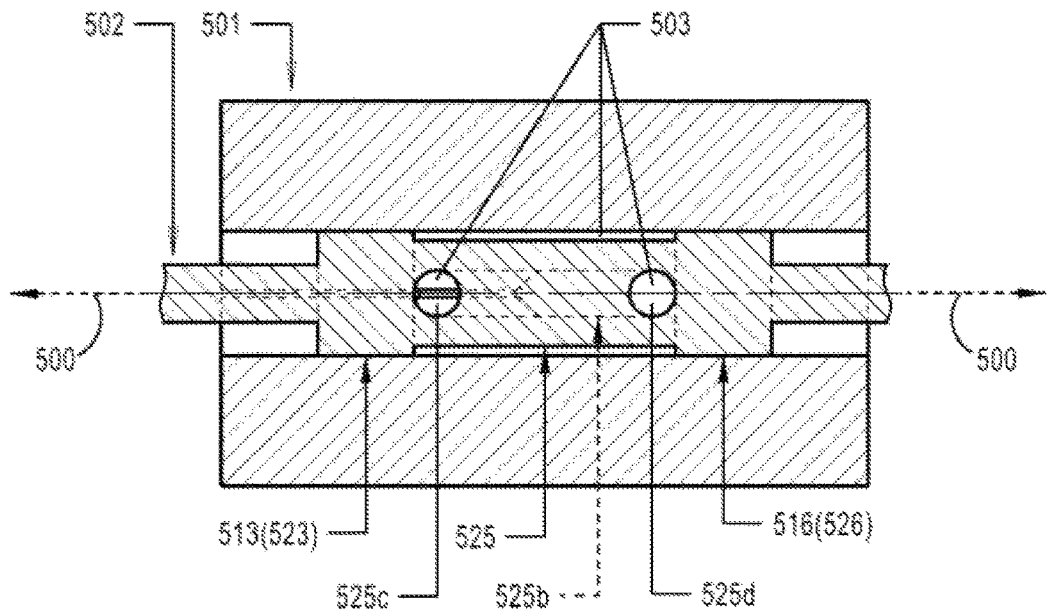
FIG. 5B is a section view of a cross section 5B-5B cut in FIG. 5A.
Figure 5C:
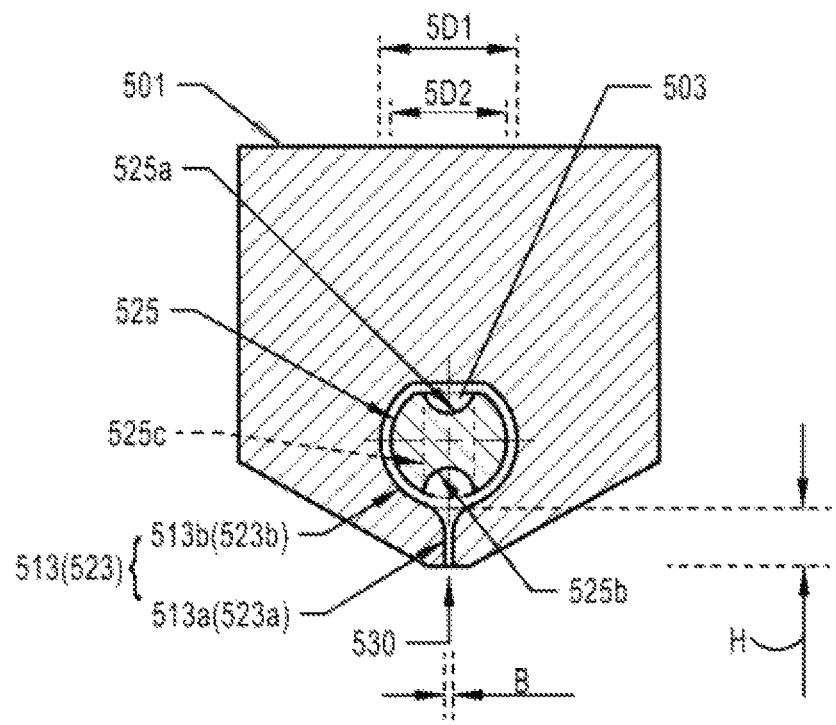
FIG. 5C is a section view of a cross section 5C-5C cut in FIG. 5A.
Figure 5D:
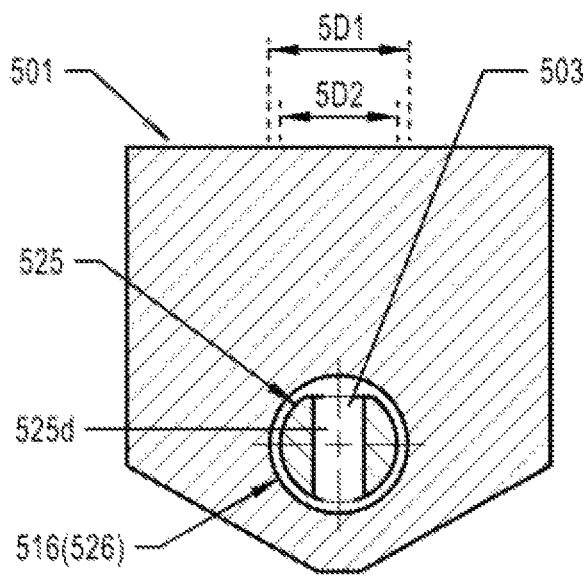
FIG. 5D is a section view of a cross section 5D-5D cut in FIG. 5A.
Figure 5E:
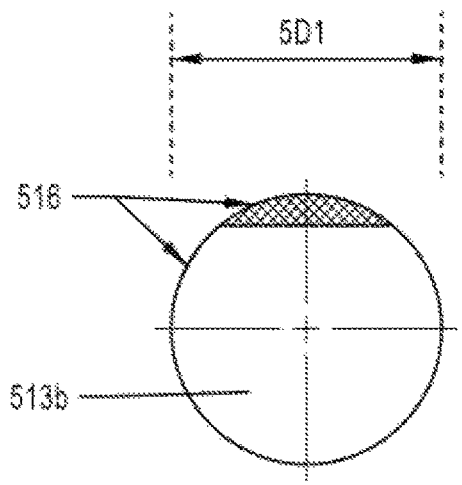
FIG. 5E is an enlarged view of projections of a balancing adaptation part and an auxiliary adaptation part in an axial direction of Embodiment 5, and shows that a difference set between the projection of the balancing adaptation part in the axial direction and the projection of the auxiliary adaptation part in the axial direction is in the shape of an arch.

FIGS. 5A-5E show Embodiment 5 of a slit-adjustable-type extrusion head of the present disclosure, FIG. 5A is a front section view of Embodiment 5, FIGS. 5B, 5C and 5D are section views of cross sections 5B-5B, 5C-5C and 5D-5D cut in FIG. 5A respectively, and FIG. 5E shows an enlarged view of axial projections of a balancing adaptation part 526 and an auxiliary adaptation part 523b along an axis 500. The embodiment shows another optional embodiment of Embodiment 3, where a reference numeral "200" is added compared with Embodiment 3. With reference to FIGS. 5A-5E, Embodiment 5 is similar to Embodiment 3, except for following differences: as shown in FIG. 5E, the auxiliary adaptation part 523b is constructed as an incomplete cylinder with the projection in the axial direction in a shape of "major arch", the auxiliary adaptation part 523b has an outer diameter of 5D1 equal to an outer diameter of the balancing adaptation part 526, and a difference set between the projection of the balancing adaptation part 526 in the axial direction and the projection of the auxiliary adaptation part 523b in the axial direction is in the shape of "inferior arch" (a shaded part in FIG. 5E).

Figure 6A:
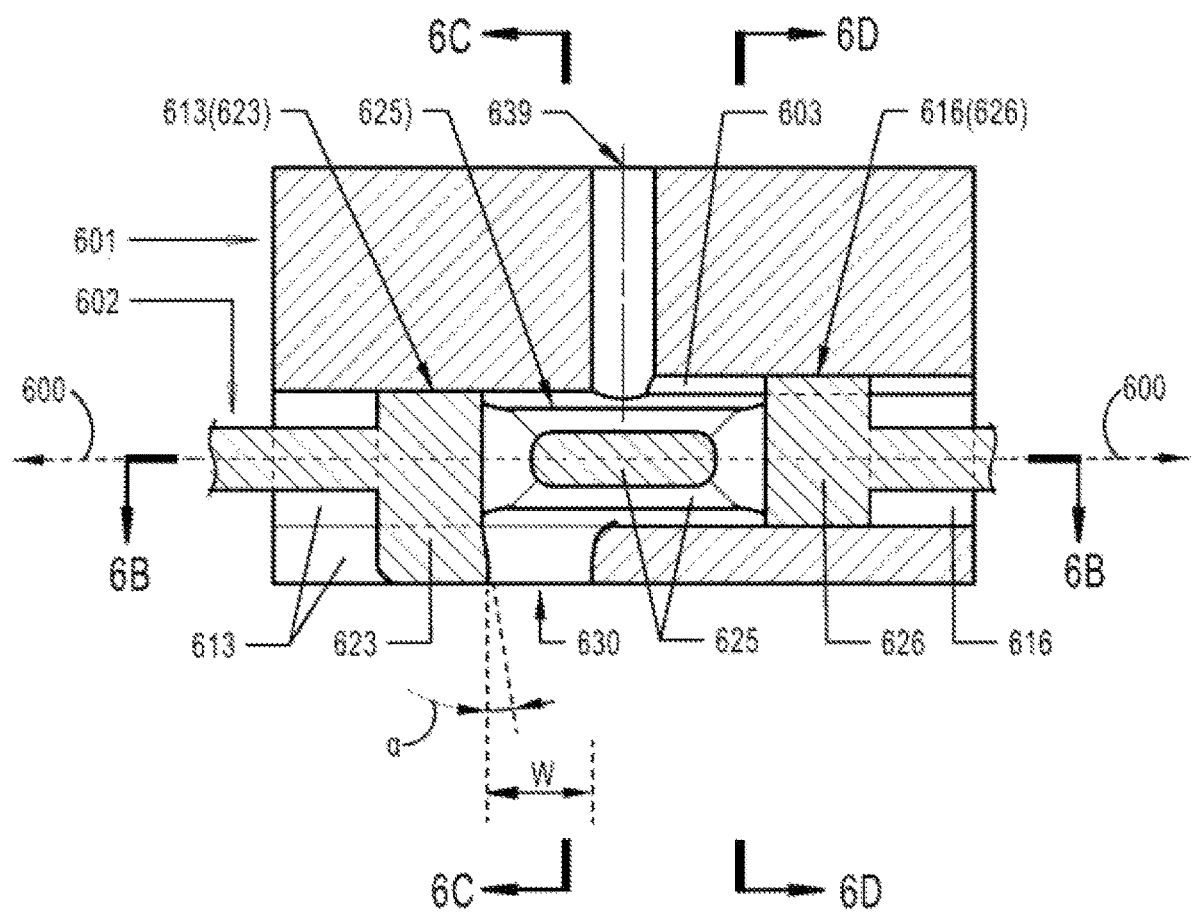
FIG. 6A is a front section view of Embodiment 6 of a slit-adjustable-type extrusion head of the present disclosure.
Figure 6B:
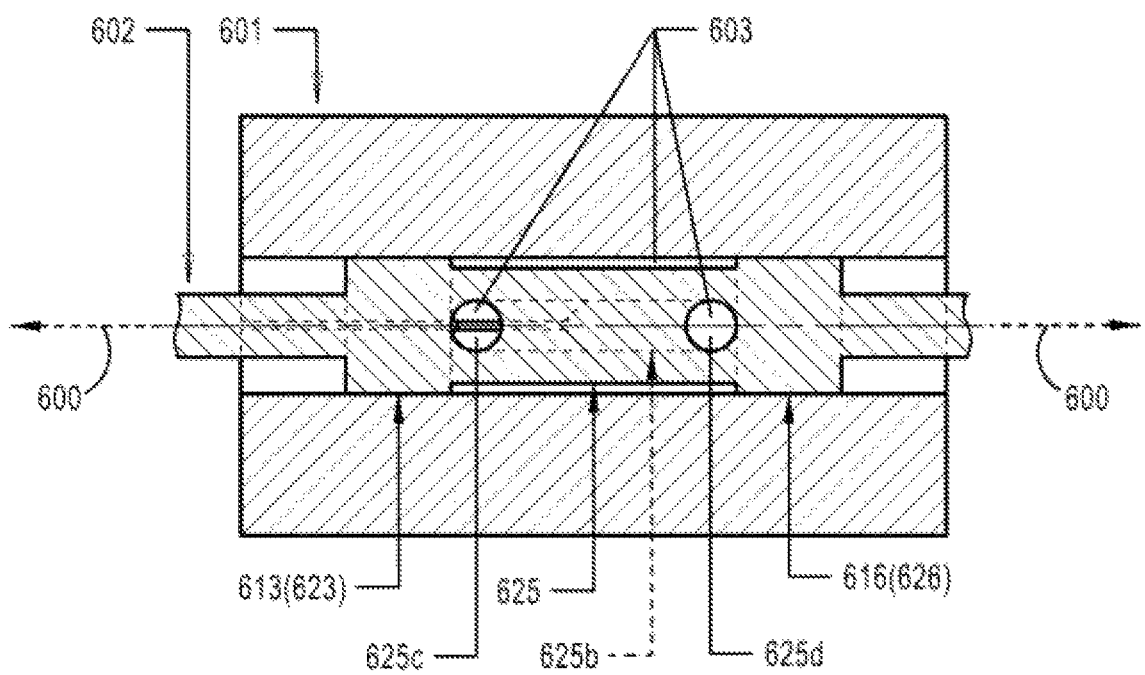
FIG. 6B is a section view of a cross section 6B-6B cut in FIG. 6A.
Figure 6C:
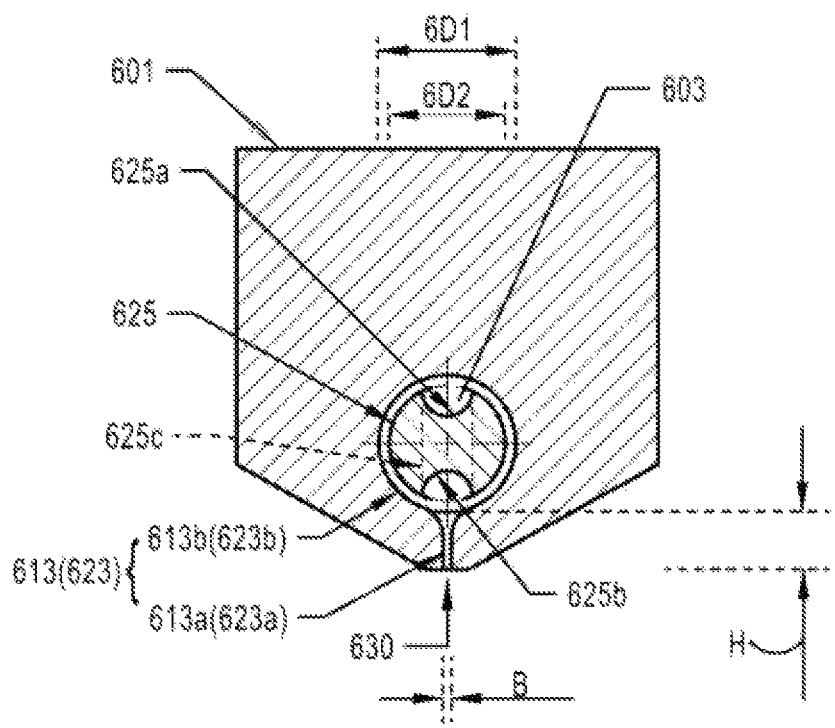
FIG. 6C is a section view of a cross section 6C-6C cut in FIG. 6A.
Figure 6D:
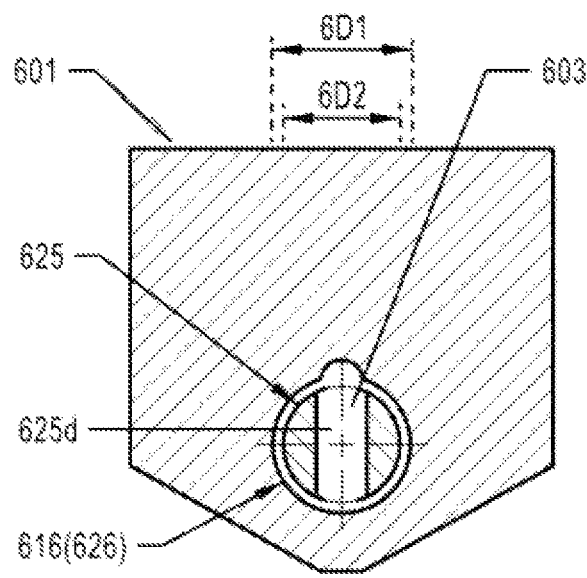
FIG. 6D is a section view of a cross section 6D-6D cut in FIG. 6A.
Figure 6E:
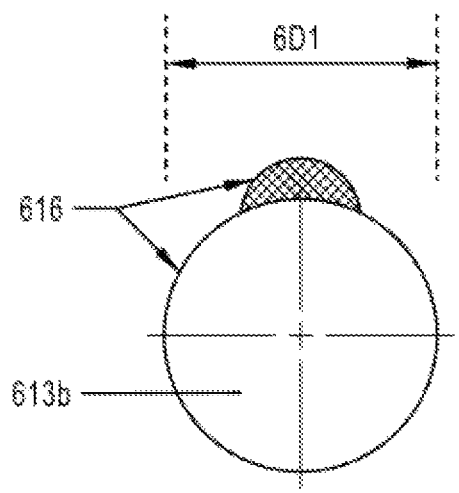
FIG. 6E is an enlarged view of projections of a balancing adaptation part and an auxiliary adaptation part in an axial direction of Embodiment 6, and shows that a difference set between the projection of the balancing adaptation part in the axial direction and the projection of the auxiliary adaptation part in the axial direction is in a shape of a crescent.

FIGS. 6A-6E show Embodiment 6 of a slit-adjustable-type extrusion head of the present disclosure, FIG. 6A is a front section view of Embodiment 6, FIGS. 6B, 6C and 6D are section views of cross sections 6B-6B, 6C-6C and 6D-6D cut in FIG. 6A respectively, and FIG. 6E shows an enlarged view of axial projections of a balancing adaptation part 626 and an auxiliary adaptation part 623b along an axis 600. The embodiment shows an optional embodiment of Embodiment 3, where a corresponding reference numeral "300" is added compared with Embodiment 3. With reference to FIGS. 6A-6E, Embodiment 6 is similar to Embodiment 3, except for following differences: as shown in FIG. 6E, the balancing adaptation part 626 is constructed as a cylinder with the projection in the axial direction in a shape of a large-diameter circle intersecting a small-diameter circle, the balancing adaptation part 626 has an outer diameter of 6D1 equal to an outer diameter of the auxiliary adaptation part 623b, and a difference set between the projection of the balancing adaptation part 626 in the axial direction and the projection of the auxiliary adaptation part 623b in the axial direction is in the shape of a crescent (a shaded part in FIG. 6E).

Figure 7A:
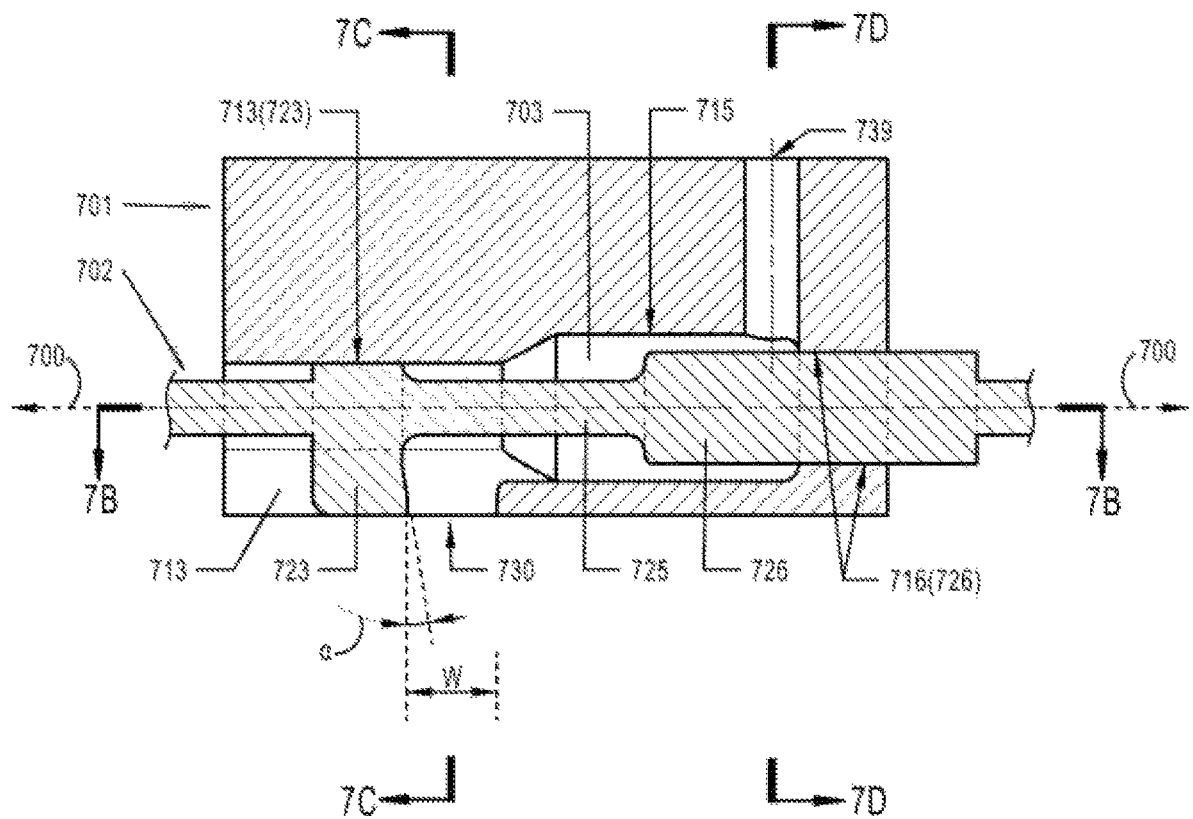
FIG. 7A is a front section view of a seventh embodiment of a slit-adjustable-type extrusion head of the present disclosure.
Figure 7B:
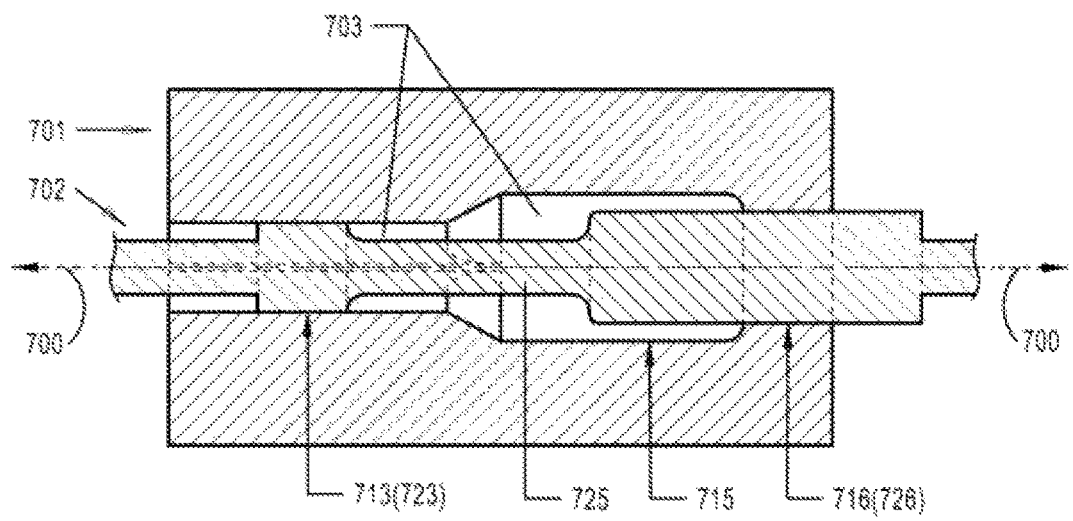
FIG. 7B is a section view of a cross section 7B-7B cut in FIG. 7A.
Figure 7C:
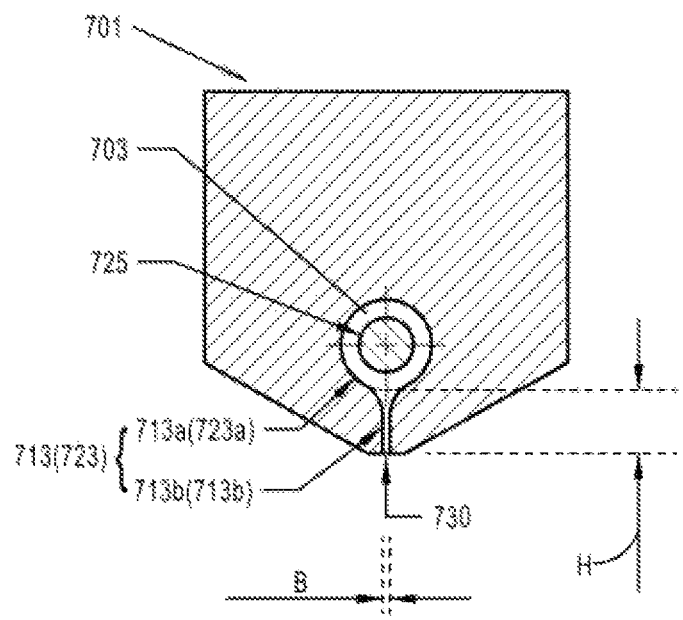
FIG. 7C is a section view of a cross section 7C-7C cut in FIG. 7A.
Figure 7D:
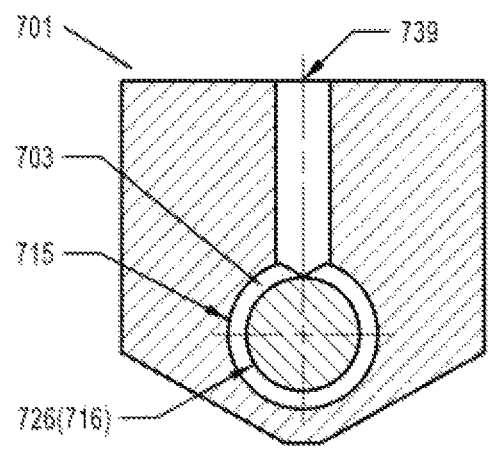
FIG. 7D is a section view of a cross section 7D-7D cut in FIG. 7A.

FIGS. 7A-7D show Embodiment 7 of a slit-adjustable-type extrusion head of the present disclosure, FIG. 7A is a front section view of Embodiment 7, and FIGS. 7B, 7C and 7D are section views of cross sections 7B-7B, 7C-7C and 7D-7D cut in FIG. 7A respectively. With reference to FIGS. 7A-7D, the slit-adjustable-type extrusion head includes: a body 701 and a core 702 which operably slide along an axis 700 relative to each other, an inlet 739 that is provided on the body 701, externally connected to a material supply device (not shown in figures) of an additive manufacturing system and used for receiving a construction material, a channel 703 that is jointly defined by the body 701 and the core 702 and used for accommodating the construction material received by the inlet 739, and a slit-type outlet 730 that is located at a bottom end of the channel 703 and used for extruding the sheet-shaped or film-shaped construction material.

The body 701 further has an adjusting slide groove 713 extending along the axis 700, a lower end in a radial direction of the adjusting slide groove penetrating a bottom surface of the body 701 to be opened to the outside of the body, a balancing slide part 716 that extends along the axis 700 and is separated from the bottom surface of the body 701, and a body interval recess 715 that is arranged between the adjusting slide groove 713 and the balancing slide part 716 and in connection with the adjusting slide groove and the balancing slide part; and the core 702 has an adjusting slider 723 that matches the adjusting slide groove 713 in shape and is in sliding cooperation with the adjusting slide groove in a liquid-tight manner, a balancing adaptation part 726 that matches the balancing slide part 716 in shape and is in sliding cooperation with the balancing slide part in a liquid-tight manner, and a core interval recess 725 that is arranged between the balancing adaptation part 726 and the adjusting slide groove 723 and in connection with the balancing adaptation part and the adjusting slider.

Radial cross sections of the body interval recess 715, the core interval recess 725 and the balancing slide part 716 are a series of concentric circles with circle centers on the axis 700; a radial gap interval is provided between the body interval recess 715 and the core 702 and forms a part of the channel 703, a radial gap interval is provided between the core interval recess 725 and the body 701 and also forms a part of the channel 703, the end of the body interval recess 715, adjacent to the balancing slide part 716, is in communication with the inlet 719, and the structure has a benefit effect of making the channel 703 form sequence flow in an axial direction, thereby preventing an obvious local flow stagnation region from being formed inside the channel 703.

The slit-type outlet 730 is jointly defined by the adjusting slide groove 713 and the adjusting slider 723, and the body 701 and the core 702 are held by a rack mechanism (not shown in the figures) of the additive manufacturing system, and operably slide along the axis 700 relative to each other under an action of an axial tensile force acting on an outer end of the core 702, thereby dynamically adjusting a slit length W (as shown in FIG. 7A) of the slit-type outlet 730; and one of the adjusting slider 723 and the balancing adaptation part 726 moves into a volume space of the channel 703 to occupy and compress the volume space of the channel, the other one of the adjusting slider 723 and the balancing adaptation part 726 moves out of the volume space the channel 703 to release and expand the volume space of the channel, and the adjusting slider 723 and the balancing adaptation part 726 are constructed to have an equal axial projection area along the axis 700, such that a compression amount and an expansion amount in a unit time are exactly equal, and the channel 703 has a constant volume.

Further, as shown in FIG. 7C, the adjusting slide groove 713 includes a slit part 713a extending upwards from the bottom surface of the body 701 and an auxiliary part 713b offsetting in a radical direction of the slit part 713a, and the adjusting slider 723 includes: a slit adaptation part 723a that matches the slit part 713a in shape and is in sliding cooperation with the slit part in a liquid-tight manner, and an auxiliary adaptation part 723b that matches the auxiliary part 713b in shape and is in sliding cooperation with the auxiliary part in a liquid-tight manner; and an auxiliary adaptation part 723b is constructed as a cylinder concentric with the balancing adaptation part 726, and a configuration relation between the slit adaptation part 723a and the auxiliary adaptation part 723b refers to FIG. 3E.

Figure 8A:
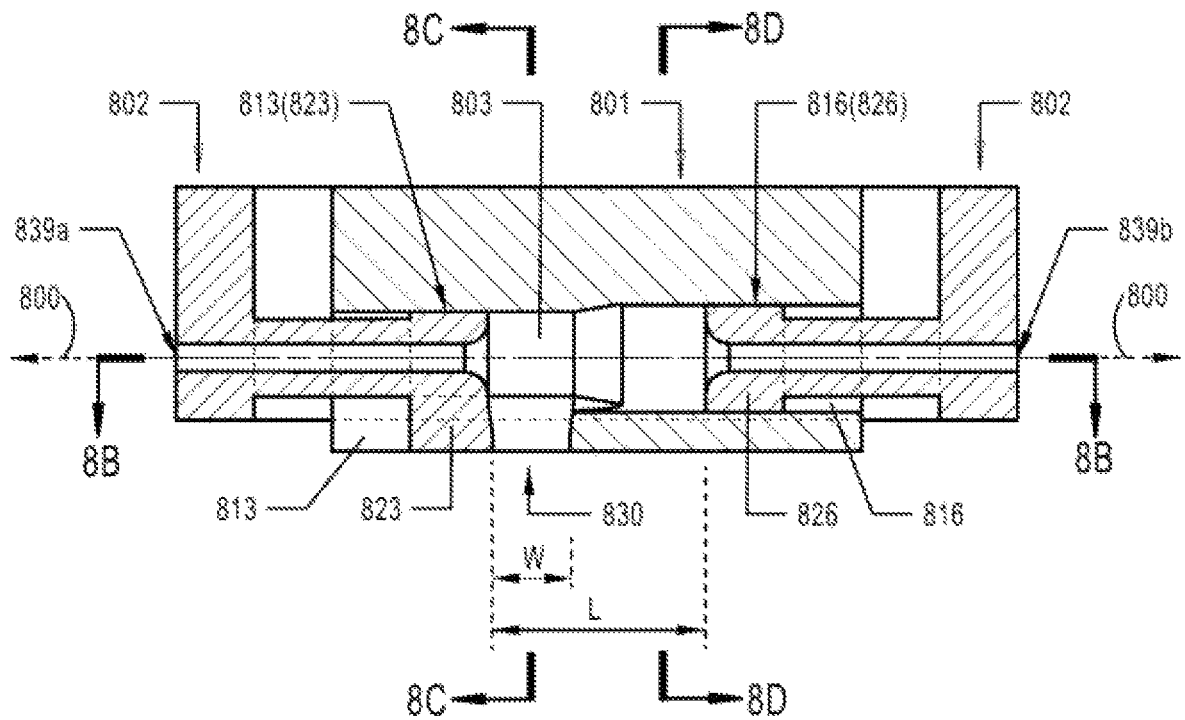
FIG. 8A is a front section view of Embodiment 8 of a slit-adjustable-type extrusion head of the present disclosure.
Figure 8B:
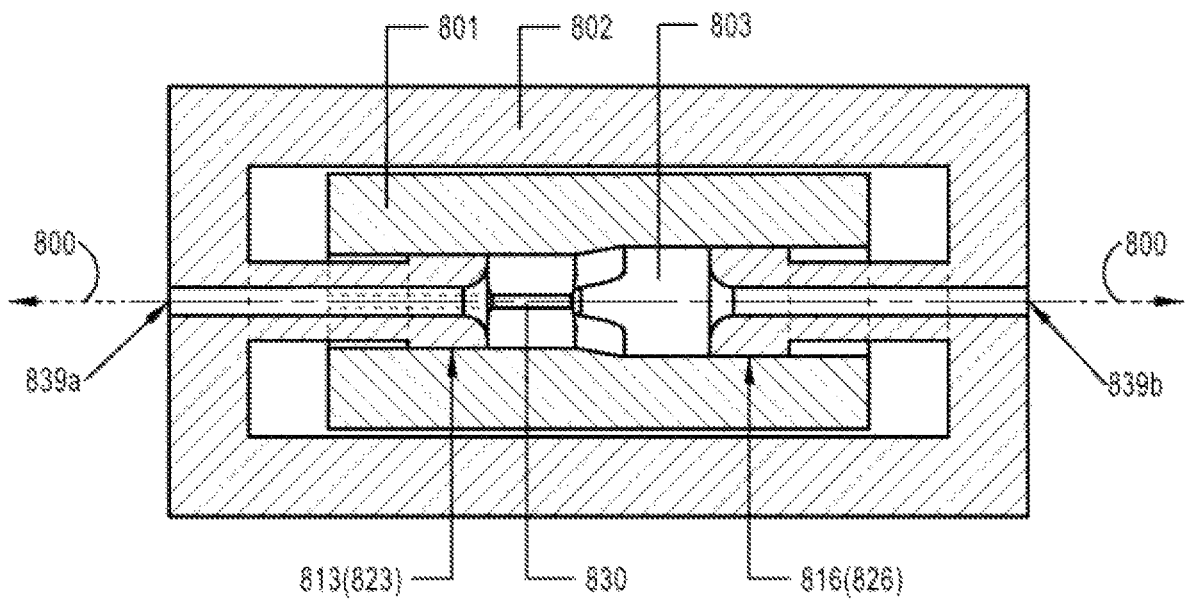
FIG. 8B is a section view of a cross section 8B-8B cut in FIG. 8A.
Figure 8C:
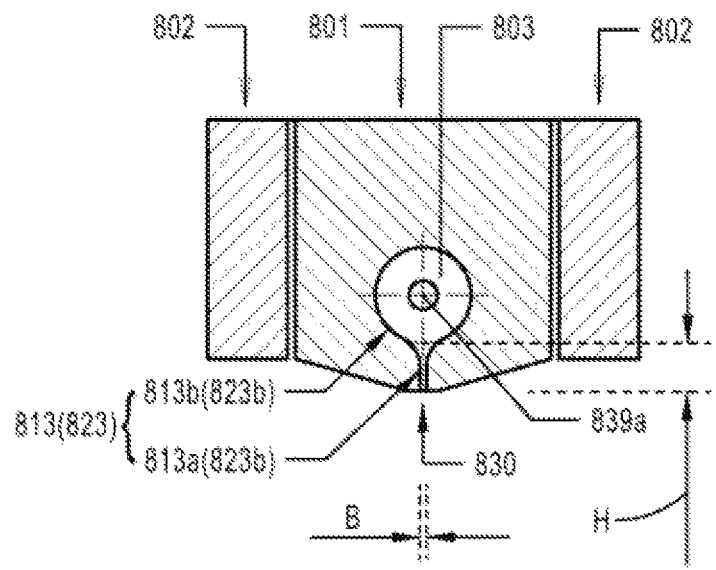
FIG. 8C is a section view of a cross section 8C-8C cut in FIG. 8A.
Figure 8D:
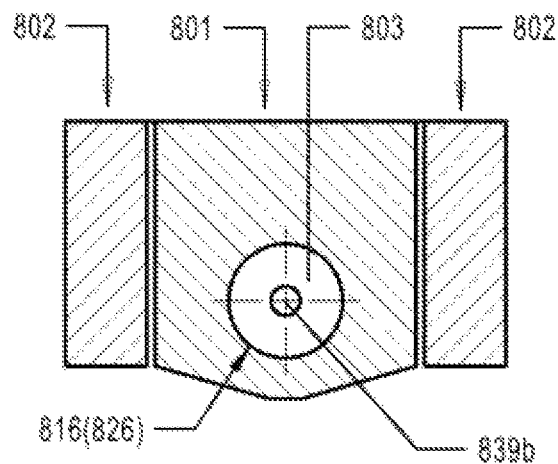
FIG. 8D is a section view of a cross section 8D-8D cut in FIG. 8A.

FIGS. 8A-8D show Embodiment 8 of a slit-adjustable-type extrusion head of the present disclosure, FIG. 8A is a front section view of the eighth embodiment, and FIGS. 8B, 8C and 8D are section views of cross sections 8B-8B, 8C-8C and 8D-8D cut in FIG. 8A respectively. With reference to FIGS. 8A-8D, the slit-adjustable-type extrusion head includes: a body 801 and a core 802 which operably slide along an axis 800 relative to each other, two inlets, that is, inlets 839a and 839b that are provided on the core 802, externally connected to a material supply device (not shown in figures) of an additive manufacturing system and used for receiving a construction material, a channel 803 that is jointly defined by the body 801 and the core 802 and used for accommodating the construction material received by the inlets 839a and 839b, and a slit-type outlet 830 that is located at a bottom end of the channel 803 and used for extruding the sheet-shaped or film-shaped construction material.

The body 801 has an adjusting slide groove 813 extending along the axis 800, a lower end in a radial direction of the adjusting slide groove penetrating a bottom surface of the body 801 to be opened to the outside of the body, a balancing slide part 816 that extends along the axis 800 and is separated from the bottom surface of the body 801; the core 802 further has an adjusting slider 823 that matches the adjusting slide groove 813 in shape and is in sliding cooperation with the adjusting slide groove in a liquid-tight manner, and a balancing adaptation part 826 which matches the balancing slide part 816 in shape and is in sliding cooperation with the balancing slide part in a liquid-tight manner, there is an axial interval distance L (as shown in FIG. 8A) between the adjusting slider 823 and the balancing adaptation part 826, the interval distance L makes a volume space of the channel 803 formed between the core 802 and the body 801, two axial ends of the volume space are in communication with the inlets 839a and 839b respectively, and a structural arrangement of the two inlets prevents an obvious local flow stagnation region from being formed inside the channel 803.

The slit-type outlet 830 is jointly defined by the adjusting slide groove 813 and the adjusting slider 823, and the body 801 and the core 802 are held by a rack mechanism (not shown in the figures) of the additive manufacturing system, and operably slide along the axis 800 relative to each other, thereby dynamically adjusting a slit length W (as shown in FIG. 8A) of the slit-type outlet 830; and one of the adjusting slider 823 and the balancing adaptation part 826 moves into the volume space of the channel 803 to occupy and compress the volume space of the channel 803, the other one of the adjusting slider 823 and the balancing adaptation part 826 moves out of the volume space of the channel 803 to release and expand the volume space of the channel 803, and the adjusting slider 823 and the balancing adaptation part 826 are constructed to have an equal axial projection area along the axis 800, such that a compression amount and an expansion amount in a unit time are exactly equal, and the channel 803 has a constant volume.

Figure 9A:
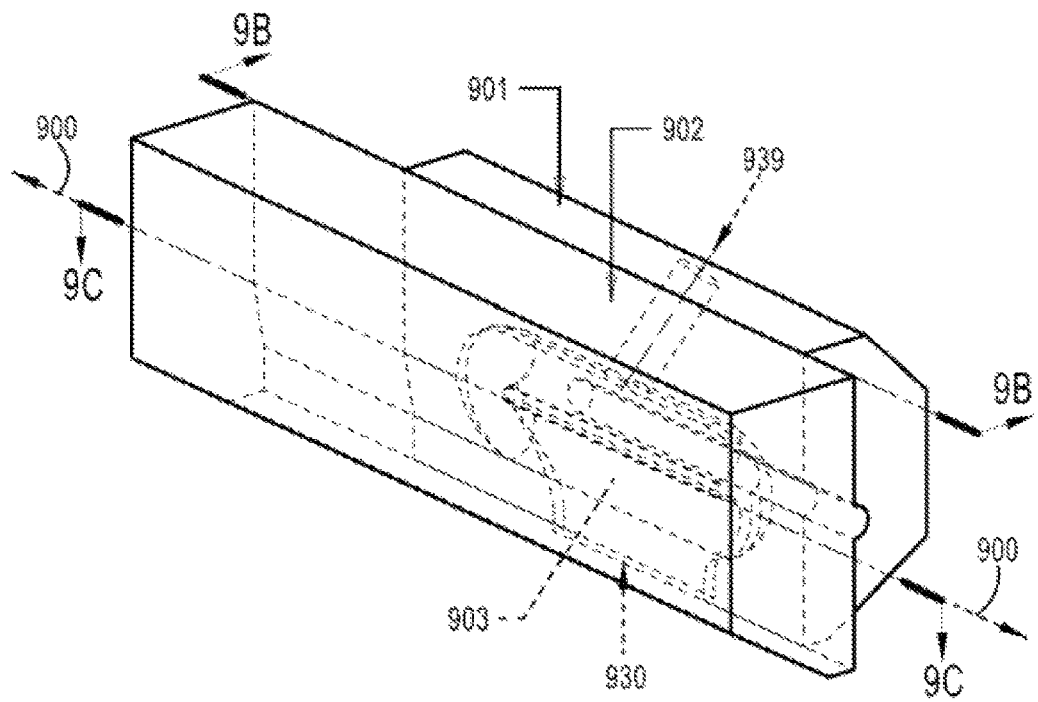
FIG. 9A is a front stereogram of a ninth embodiment of a slit-adjustable-type extrusion head of the present disclosure.

FIGS. 9A-9D show a ninth embodiment of a slit-adjustable-type extrusion head of the present disclosure, FIG. 9A is a front section view of the ninth embodiment, and as shown in FIG. 9A, the slit-adjustable-type extrusion head includes: a body 901 and a core 902 which operably slide along an axis 900 relative to each other, an inlet 939 that is provided on the core 902, externally connected to a material supply device (not shown in figure) of an additive manufacturing system and used for receiving a construction material, a channel 903 that is jointly defined by the body 901 and the core 902 and used for accommodating the construction material received by the inlet 939, and a slit-type outlet 930 that is located at a bottom end of the channel 903 and used for extruding the sheet or film-shaped construction material.

Figure 9B:
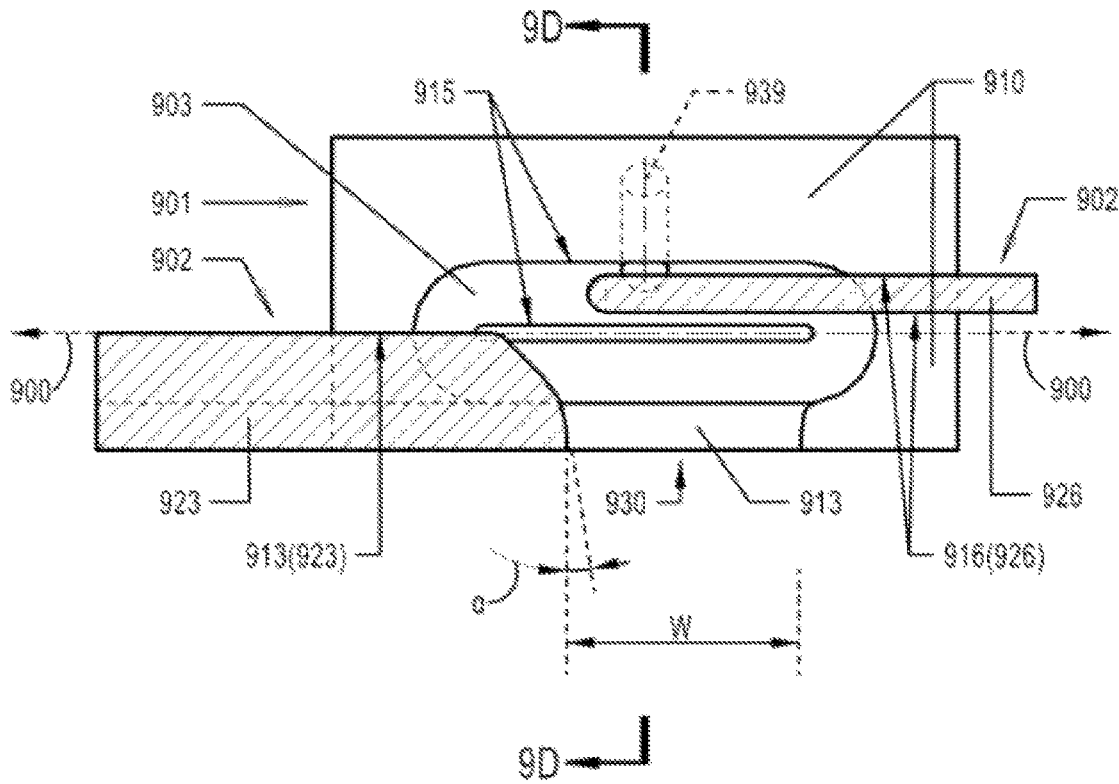
FIG. 9B is a section view of a cross section 9B-9B cut in FIG. 9A.
Figure 9C:
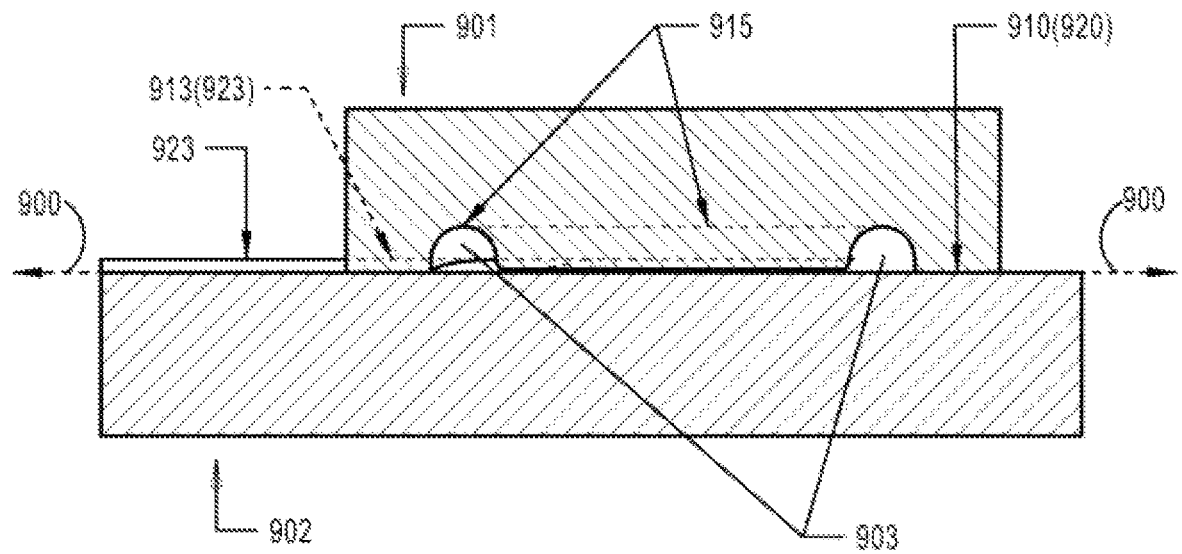
FIG. 9C is a section view of a cross section 9C-9C cut in FIG. 9A.
Figure 9D:
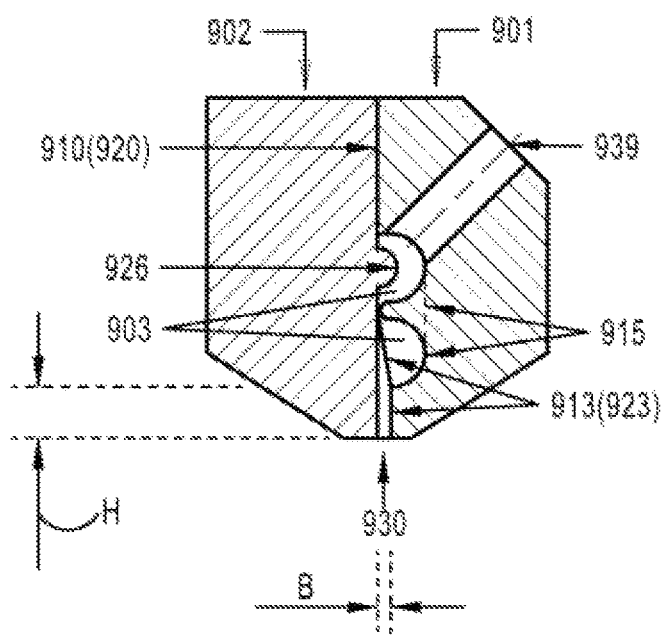
FIG. 9D is a section view of a cross section 9D-9D cut in FIG. 9B.

FIGS. 9B and 9C are section views of cross sections 9B-9B and 9C-9C cut in FIG. 9A respectively. FIG. 9D is a section view of a cross section 9D-9D cut in FIG. 9B. With reference to FIGS. 9B-9D, the body 901 further has a sliding plane 910, an adjusting slide groove 913 that is provided on the sliding plane 910 and extends along the axis 900, a lower end in a radial direction of the adjusting slide groove penetrating a bottom surface of the body 901 to be opened to the outside of the body, a balancing slide part 916 that is arranged on the sliding plane 910, extends along the axis 900 and is separated from the bottom surface of the body 901, and a body interval recess 915 that is arranged on the sliding plane 910 and arranged between the balancing slide part 916 and the adjusting slide groove 913 and in connection with the balancing slide part and the adjusting slide groove; and the core 902 has a sliding adaption plane 920 that matches the sliding plane 910 in shape and is in sliding cooperation with the sliding plane in a liquid-tight manner, an adjusting slider 923 that matches the adjusting slide groove 913 in shape and is in sliding cooperation with the adjusting slide groove in a liquid-tight manner, and a balancing adaptation part 926 which matches the balancing slide part 916 in shape and is in sliding cooperation with the balancing slide part in a liquid-tight manner.

The body interval recess 915 is constructed as an annular groove structure and a radial gap interval is formed between the body interval recess 915 and the core 902, the radial gap interval forms a part of the channel 903 and forms an annular channel in a central region of the channel 903, a surrounding axis of the annular channel is orthogonal to the axis 900, and the annular channel structure has a beneficial effect of preventing a short circuit or an obvious local flow stagnation region from being formed inside the channel.

An axial boundary of the slit-type outlet 930 is jointly defined by the adjusting slide groove 913 and the adjusting slider 923, and the body 901 and the core 902 are held by a rack mechanism (not shown in the figures) of the additive manufacturing system, and operably slide along the axis 900 relative to each other, thereby dynamically adjusting a slit length W (as shown in FIG. 9A) of the slit-type outlet 930; and one of the adjusting slider 923 and the balancing adaptation part 926 moves into a volume space of the channel 903 to occupy and compress the volume space of the channel, the other one of the adjusting slider 923 and the balancing adaptation part 926 moves out of the volume space of the channel 903 to release and expand the volume space of the channel, and the adjusting slider 923 and the balancing adaptation part 926 are constructed to have an equal axial projection area along the axis 900, such that compression amount and expansion amount in a unit time are exactly equal, and the channel 903 has a constant volume.

An outer end surface of the slit-type outlet in the above embodiments has a coating, and a material of the coating and the construction material have poor wettability, and an appropriate coating material includes fluorinated polymer (for example, polytetrafluoroethylene, fluorinated ethylene propylene, or perfluoro alkoxyl alkane resin), a rhombic carbon material or a combination thereof.

Figure 10:
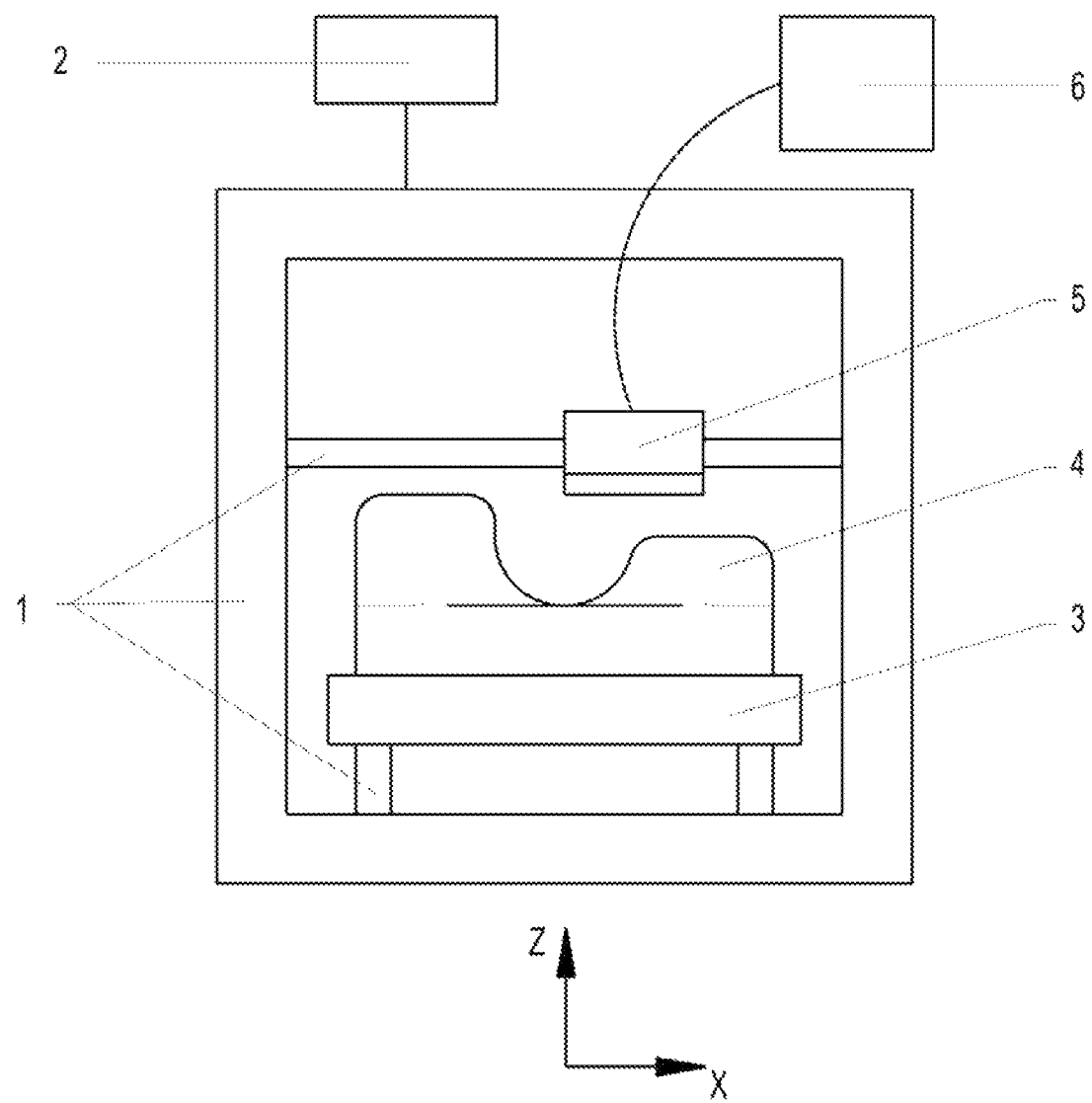
FIG. 10 is a front section view of an embodiment of an additive manufacturing system device of the present disclosure.

FIG. 10 is a front section view of an embodiment of an additive manufacturing system device of the present disclosure. With reference to FIG. 10, the additive manufacturing system device includes a rack mechanism unit 1, a controller 2, a basic construction platform unit 3 and construction material supply unit 6. The basic construction platform unit 3 works close to a position below the slit-type outlet of the slit-adjustable-type extrusion head and is used for bearing the three-dimensional (3D) part 4. The rack mechanism unit 1 is used for holding and driving the slit-adjustable-type extrusion head 5 and the basic construction platform unit 3.

What is claimed is:
1. A slit-adjustable-type extrusion head used in an extrusion-based additive manufacturing system and comprising: a body being provided with an adjusting slide groove extending in an axial direction of the body, a lower end in a radial direction of the adjusting slide groove penetrating a bottom surface of the body to be opened to an outside of the body, the radial direction being orthogonal to the axial direction, and the bottom surface being parallel to the axial direction; a core being provided with an adjusting slider that matches the adjusting slide groove in shape and is in sliding cooperation with the adjusting slide groove in a liquid-tight manner; at least one inlet that is constructed on the body or/and the core and used for receiving a construction material; a channel that is constructed by a volume space jointly defined by the body and the core and used for accommodating the construction material received by the at least one inlet; and a slit-type outlet that is formed at a bottom end of the channel, a boundary of the slit-type outlet being jointly defined by the adjusting slide groove and the adjusting slider, and the slit-type outlet being used for extruding the construction material,
wherein
the body further comprises a balancing slide part that extends in the axial direction, is in communication with the channel, and is separated from the bottom surface of the body;
the core further comprises a balancing adaptation part that matches the balancing slide part in shape and is in sliding cooperation with the balancing slide part in a liquid-tight manner;
the body and the core are held by a rack mechanism of the additive manufacturing system and operably slide in the axial direction relative to each other, thereby adjusting a slit length of the slit-type outlet in the axial direction; and one of the adjusting slider and the balancing adaptation part moves into a volume space of the channel to occupy and compress the volume space of the channel, the other one of the adjusting slider and the balancing adaptation part moves out of the volume space of the channel to release and expand the volume space of the channel, and an occupation and compression amount and a release and expansion amount in a unit time are exactly equal, such that the channel has a constant volume.

2. The slit-adjustable-type extrusion head as claimed in claim 1, wherein a projection area of the balancing adaptation part in the axial direction is equal to a projection area of the adjusting slider in the axial direction.

3. The slit-adjustable-type extrusion head as claimed in claim 2, wherein
the body further comprises a body interval recess that is arranged between the adjusting slide groove and the balancing slide part and in connection with the adjusting slide groove and the balancing slide part, and a radial gap interval is provided between the body interval recess and the core and forms a part of the channel.

4. The slit-adjustable-type extrusion head as claimed in claim 2, wherein
the core further comprises a core interval recess that is arranged between the adjusting slider and the balancing adaptation part and in connection with the adjusting slider and the balancing adaptation part, and a radial gap interval is provided between the core interval recess and the body and forms a part of the channel.

5. The slit-adjustable-type extrusion head as claimed in claim 3, wherein
the radial gap interval is at least partially constructed to form an annular channel, and a surrounding axis of the annular channel is orthogonal to the axial direction.

6. The slit-adjustable-type extrusion head as claimed in claim 1, wherein
the adjusting slide groove comprises: a slit part extending upwards from the bottom surface of the body and an auxiliary part extending from an upper end of the slit part along the radial direction;
the adjusting slider comprises: a slit adaptation part that matches the slit part in shape and is in sliding cooperation with the slit part in a liquid-tight manner, and an auxiliary adaptation part that matches the auxiliary part in shape and is in sliding cooperation with the auxiliary part in a liquid-tight manner;
a projection of the slit adaptation part in the axial direction is in a shape of a rectangle or a horn mouth with a wider upper part and a narrower lower part, and a geometric shape presented by a projection of the auxiliary adaptation part in the axial direction comprises a polygon, a circle, an ellipse, an arch or a combination of the polygon, the circle, the ellipse and the arch; and
a geometric shape presented by a projection of the balancing adaptation part in the axial direction comprises a polygon, a circle, an ellipse, an arch, or a combination of the polygon, the circle, the ellipse and the arch.

7. The slit-adjustable-type extrusion head as claimed in claim 6, wherein
the projection of the balancing adaptation part in the axial direction completely covers the projection of the auxiliary adaptation part in the axial direction, and a geometric shape presented by a difference set between the projection of the balancing adaptation part in the axial direction and the projection of the auxiliary adaptation part in the axial direction comprises a polygon, a circular ring, an arch or a crescent.

8. The slit-adjustable-type extrusion head as claimed in claim 3, wherein
the adjusting slider and the balancing adaptation part are constructed as an integrated sheet body, and the projection of the adjusting slider in the axial direction and the projection of the balancing adaptation part in the axial direction are constructed as congruent rectangles offset by a set distance in a vertical direction, the vertical direction being orthogonal to the axial direction.

9. The slit-adjustable-type extrusion head as claimed in claim 1, wherein
an axial tensile force, operably acting on an outer end of the core in the axial direction, drives the core and the body to slide bidirectionally in the axial direction relative to each other.

10. The slit-adjustable-type extrusion head as claimed in claim 1, wherein
the body is constructed by combining two half dies into a whole.

11. The slit-adjustable-type extrusion head as claimed in claim 1, wherein axial side end surfaces of the adjusting slide groove and the adjusting slider defining an axial boundary of the slit-type outlet are provided with inwardly expanding flow promoting bevels, an included angle between each of the flow promoting bevels and a vertical direction forms a flow promoting angle $\alpha$, and the flow promoting angle $\alpha$ ranges from 3° to 10°.

12. The slit-adjustable-type extrusion head as claimed in claim 1, further comprising
a heating unit arranged adjacent to the channel, so as to melt the construction material accommodated in the channel into molten flow or maintain a molten flow to at least an extrudable state, wherein a heating manner of the heating unit comprises resistance heating or induction heating.

13. The slit-adjustable-type extrusion head as claimed in claim 1, wherein
the bottom surface of the body and a bottom surface of the core are provided with coatings, and a material of each of the coatings and the construction material have poor wettability.

14. An additive manufacturing system device with at least one slit-adjustable-type extrusion head as claimed in claim 1.

15. The additive manufacturing system device with the slit-adjustable-type extrusion head as claimed in claim 14, further comprising following units:
at least one construction material supply unit comprising a roller type construction material supply unit, a screw extrusion feeding type construction material supply unit, and a metering feed pump type construction material supply unit;
a basic construction platform unit that works close to a position below the slit-type outlet of the slit-adjustable-type extrusion head and is used for bearing a three-dimensional (3D) part; and
a rack mechanism unit used for holding and driving the slit-adjustable-type extrusion head, so as to make the slit-adjustable-type extrusion head and the basic construction platform unit move, relative to each other, along three dimensions of "X", "Y" and "Z" axes in a rectangular coordinate system according to an instruction, to make the body and the core of the slit-adjustable-type extrusion head slide, relative to each other, in the "X" axis according to the instruction, and to further make the slit-adjustable-type extrusion head and the basic construction platform unit horizontally rotate, relative to each other, with the "Z" axis as an axis according to the instruction, and further, the whole additive manufacturing system device further being capable of rotating with the "Y" axis as an axis according to the instruction, wherein the rack mechanism unit comprises a driving device, a transmission device and a guiding device, the driving device comprising a stepping motor, a servo motor or a linear motor, the transmission device comprising a synchronous belt transmission device, a rope transmission device, a spiral transmission device, a gear transmission device or a linear motor transmission device, and the guiding device comprising a linear sliding rail.

16. The slit-adjustable-type extrusion head as claimed in claim 4, wherein
the radial gap interval is at least partially constructed to form an annular channel, and a surrounding axis of the annular channel is orthogonal to the axial direction.

\* \* \* \* \*